US012804338B2

(12) United States Patent
Harianawala et al.

(10) Patent No.: US 12,804,338 B2
(45) Date of Patent: Nov. 17, 2026

(54) HEARING INSTRUMENT FITTING SYSTEMS

(71) Applicant: Starkey Laboratories, Inc., Eden Prairie, MN (US)

(72) Inventors: Jumana Harianawala, Eden Prairie, MN (US); Jingjing Xu, Eden Prairie, MN (US); Justin Burwinkel, Eden Prairie, MN (US); Tim Schoof, Oakland, CA (US); Paul Reinhart, Minneapolis, MN (US); Martin Mckinney, Minneapolis, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 71 days.

(21) Appl. No.: 18/583,577

(22) Filed: Feb. 21, 2024

(65) Prior Publication Data

US 2025/0016512 A1 Jan. 9, 2025

Related U.S. Application Data

(63) Continuation of application No. PCT/US2022/041342, filed on Aug. 24, 2022.

(Continued)

(51) Int. Cl.
*H04R 25/00* (2006.01)

(52) U.S. Cl.
CPC ........... *H04R 25/70* (2013.01); *H04R 25/507* (2013.01)

(58) Field of Classification Search
CPC .............................. H04R 25/70; H04R 25/507

(Continued)

(56) References Cited

U.S. PATENT DOCUMENTS 6,081,809 A 6/2000 Kumagai
8,498,878 B2 7/2013 Hupke et al.

(Continued)

FOREIGN PATENT DOCUMENTS

EP 2521377 A1 7/2012
EP 3236673 A1 10/2017

(Continued)

OTHER PUBLICATIONS

Alamdari et al., "Personalization of Hearing Aid Compression by Human-in-the-Loop Deep Reinforcement Learning", IEEE Access, vol. 8, Nov. 2, 2020, pp. 203503-203515.

(Continued)

*Primary Examiner* — George C Monikang
(74) *Attorney, Agent, or Firm* — Shumaker & Sieffert, P.A.

(57) ABSTRACT

A method for fitting a hearing instrument comprises generating training data based on post-fitting adjustments made to settings of a plurality of hearing instruments and based on profiles of users of the plurality of hearing instruments, wherein the post-fitting adjustments are made to the settings of the plurality of hearing instruments after initial uses of the plurality of hearing instruments. The method further comprises training a machine learning (ML) model based on the training data to generate initial fitting suggestions. The method also comprises, prior to an initial use of a current hearing instrument by a current user, generating an initial fitting suggestion for the hearing instrument of the current user by applying the ML model to input that includes a profile of the current user.

20 Claims, 13 Drawing Sheets

Related U.S. Application Data

(60) Provisional application No. 63/236,808, filed on Aug. 25, 2021.

(58) Field of Classification Search
USPC .................................................. 381/312, 314
See application file for complete search history.

(56) References Cited

U.S. PATENT DOCUMENTS

| | | | | |
|---|---|---|---|---|
| 8,503,703 | B2 | 8/2013 | Eaton et al. | |
| 8,521,565 | B2 | 8/2013 | Faulkner et al. | |
| 8,751,934 | B2 | 6/2014 | Young | |
| 8,965,016 | B1 | 2/2015 | Howes | |
| 9,729,982 | B2 | 8/2017 | Nishizaki | |
| 10,482,999 | B2 | 11/2019 | Sethumadhavan et al. | |
| 2003/0088440 | A1 | 5/2003 | Dunn | |
| 2008/0243552 | A1 | 10/2008 | Asakawa | |
| 2012/0253843 | A1 | 10/2012 | Schnell | |
| 2014/0108043 | A1 | 4/2014 | Ach et al. | |
| 2015/0271607 | A1 | 9/2015 | Sabin | |
| 2017/0201839 | A1 | 7/2017 | Manchester | |
| 2017/0230764 | A1* | 8/2017 | Simonides | H04R 25/70 |
| 2018/0182470 | A1 | 6/2018 | Kalathil | |
| 2018/0213339 | A1 | 7/2018 | Shah et al. | |
| 2019/0090073 | A1 | 3/2019 | Wendt et al. | |
| 2020/0245938 | A1 | 8/2020 | Xu et al. | |

FOREIGN PATENT DOCUMENTS

| | | | |
|---|---|---|---|
| EP | 3836570 | A1 | 6/2021 |
| GB | 2586817 | A | 3/2021 |
| JP | 2017152865 | A | 8/2017 |
| WO | 9919779 | A1 | 4/1999 |
| WO | 2007042043 | A2 | 4/2007 |
| WO | 2008068914 | A1 | 6/2008 |
| WO | 2015009564 | A1 | 1/2015 |
| WO | 2017139383 | A1 | 8/2017 |
| WO | 2020144160 | A1 | 7/2020 |

OTHER PUBLICATIONS

International Preliminary Report on Patentability from International Application No. PCT/US2022/041342 dated Mar. 7, 2024, 7 pp.

International Search Report and Written Opinion of International Application No. PCT/US2022/041342 dated Mar. 2, 2023, 10 pp.

Jorgensen et al., “Audiology Happy Hour”, Facebook, Jul. 30, 2020, 3 pp.

Mondol et al., “A Machine Learning Approach to Fitting Prescription for Hearing Aids”, Electronics, vol. 8, No. 7, Jun. 28, 2019, 13 pp.

Response to Communication Pursuant to Rules 161(1) and 162 EPC dated Apr. 4, 2024, from counterpart European Application No. 22769845.3, filed Oct. 3, 2024, 16 pp.

Communication pursuant to Article 94(3) EPC from counterpart European Application No. 22769845.3 dated May 11, 2026, 5 pp.

Response to Communication pursuant to Article 94(3) EPC dated May 11, 2026, from counterpart European Application No. 22769845.3 filed Sep. 11, 2026, 125 pp.

* cited by examiner

HEARING INSTRUMENT FITTING SYSTEMS

This application is a continuation of International Application No. PCT/US2022/041342, filed Aug. 24, 2022, which claims priority to U.S. provisional patent application 63/236,808, filed Aug. 25, 2021, the entire content of both of which are incorporated herein by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earphones, headphones, hearables, and so on. Some hearing instruments include features in addition to or in the alternative to environmental sound amplification. For example, some modem hearing instruments include advanced audio processing for improved device functionality, controlling and programming the devices, and beamforming, and some can communicate wirelessly with external devices including other hearing instruments (e.g., for streaming media).

An initial fitting a hearing instrument is a process in which settings of the hearing instrument are adapted to an individual user for the first time. Moreover, adjustments may be made to the settings of the hearing instrument after the initial fitting of the hearing instrument.

SUMMARY

This disclosure describes techniques that may improve the fitting process for hearing instruments. In general, the initial fitting of a hearing instrument for a user is based on the levels of the user's hearing loss. However, adjusting the settings of the hearing instrument to produce satisfactory sound may involve a wide variety of factors in addition to the levels of the user's hearing loss. Moreover, settings that may be appropriate for one acoustic environment may not be appropriate for another acoustic environment. Accordingly, adjustments may be made to the settings of hearing instruments after the initial fitting. However, such post-fitting adjustments are not used as a basis for the initial fitting process. As a result, the initial fitting process may result in unsatisfactory settings and may cause the user to request more post-fitting adjustments.

As described herein, a processing system may generate training data based on post-fitting adjustments made to settings of a plurality of hearing instruments and based on profiles of users of the plurality of hearing instruments. The post-fitting adjustments are made to the settings of the plurality of hearing instruments after initial uses of the plurality of hearing instruments. The processing system may train a machine learning (ML) model based on the training data to generate initial fitting suggestions. Prior to an initial use of a current hearing instrument by a current user, the processing system may generate an initial fitting suggestion for the hearing instrument of the current user by applying the ML model to input that includes a profile of the current user.

In one example, this disclosure describes a method for fitting a hearing instrument, the method comprising: generating, by a processing system, training data based on post-fitting adjustments made to settings of a plurality of hearing instruments and based on profiles of users of the plurality of hearing instruments, wherein the post-fitting adjustments are made to the settings of the plurality of hearing instruments after initial uses of the plurality of hearing instruments; training, by the processing system, a machine learning (ML) model based on the training data to generate initial fitting suggestions; and prior to an initial use of a current hearing instrument by a current user, generating, by the processing system, an initial fitting suggestion for the hearing instrument of the current user by applying the ML model to input that includes a profile of the current user.

In another example, this disclosure describes a computing system comprising: a data storage system configured to store data indicating post-fitting adjustments made to settings of a plurality of hearing instruments and profiles of users of the plurality of hearing instruments; and a processing system configured to: generate training data based on the post-fitting adjustments made to the settings of the plurality of hearing instruments and based on the profiles of the users of the plurality of hearing instruments, wherein the post-fitting adjustments are made to the settings of the plurality of hearing instruments after initial uses of the plurality of hearing instruments; train a machine learning (ML) model based on the training data to generate initial fitting suggestions; and prior to an initial use of a current hearing instrument by a current user, generate an initial fitting suggestion for the hearing instrument of the current user by applying the ML model to input that includes a profile of the current user.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
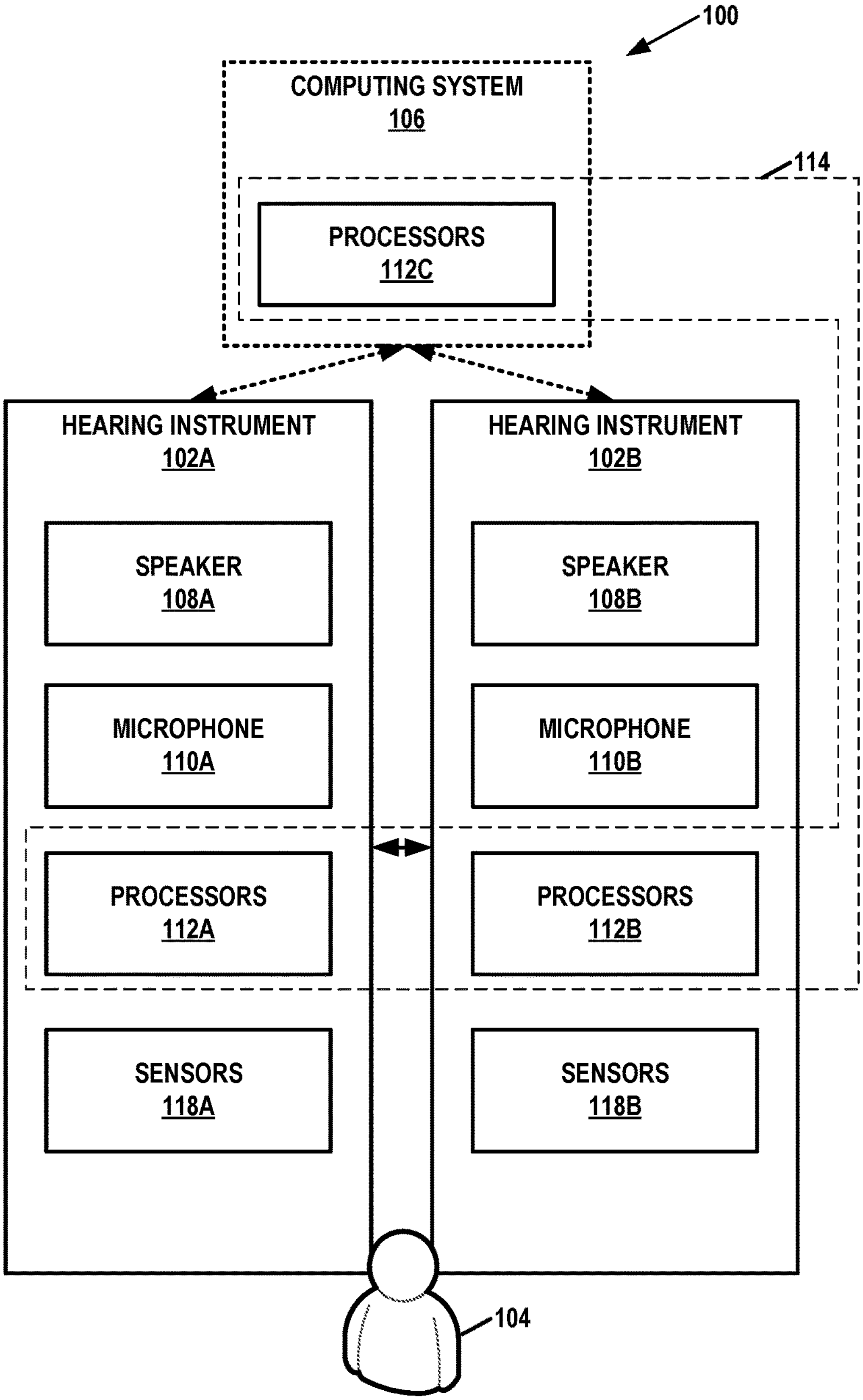
FIG. 1 is a conceptual diagram illustrating an example system that includes one or more hearing instruments, in accordance with one or more aspects of this disclosure.

During an initial fitting process, various settings of a user's hearing instruments are customized to the user's needs. Typically, the initial fitting process is based only on the user's hearing thresholds. In other words, an audiogram-based gain prescription is used for the settings of the user's hearing instruments. While an important factor in hearing instrument success is to provide the user with the best possible first fit, audiogram-based gain prescription strategies often fail to do so, often resulting in unsatisfactory fittings. Consequently, the user may need to engage in an iterative process to refine the settings of the user's hearing instruments. Engaging in this iterative process may be time consuming and error prone. For instance, traveling to visit a hearing professional to refine the settings of the user's hearing instruments may be difficult or expensive. Furthermore, due to high patient-to-clinician ratios, follow-up with new fittings or adjustments may be lacking, which may result in dissatisfaction and hearing instrument returns. This problem is likely to grow worse because there is a growing population of individuals with hearing loss. Even when a hearing professional is available for follow-up, the complexity of fitting modern hearing aids requires considerable time and effort. Moreover, the acoustic environment of a hearing professional's office may not be representative of the acoustic environment in which the user is having trouble. Therefore, continued refinement of the settings of hearing instruments can optimize the hearing instrument fitting in real-life environments encountered by the user, helping to increase hearing instrument satisfaction in daily life. Accordingly, improvements to the initial fitting process would help reduce the difficulties that users experience when refining the settings of their hearing instruments.

Hence, in accordance with one or more techniques of this disclosure, a processing system may generate training data based on post-fitting adjustments made to settings of a plurality of hearing instruments and based on profiles of users of the plurality of hearing instruments. The post-fitting adjustments are made to the settings of the plurality of hearing instruments after initial uses of the plurality of hearing instruments. The processing system may train a machine learning (ML) model based on the training data to generate initial fitting suggestions. Because the ML model is trained based on post-fitting adjustments, the ML model may be able to generate better settings during the initial fitting process.

In some examples, the processing system may generate adjustment records that include data describing post-fitting adjustment to the settings of the hearing instruments. For example, an adjustment record may indicate the settings of a hearing instrument after a post-fitting adjustment to the hearing instrument. In some examples, the adjustment records may also include one or more of data describing a complaint of the user, as subjectively described by the user, that led to the post-fitting adjustment, objective data associated with the complaint, data describing a hearing professional's interpretation of the complaint of the user, or data describing a plan or performed actions for addressing the complaint of the user. Because the adjustment records may include such data, the adjustment records may be used by hearing professionals to understand the history of post-fitting adjustments to a user's hearing instruments while continuing the process of refining the settings of the user's hearing instruments. Thus, the adjustment records may serve multiple purposes, e.g., as a basis for training data and as records usable by hearing professionals. In this way, the adjustment records may help accelerate the process of refining the settings of the hearing instruments after the initial fitting process is complete.

Furthermore, in some examples, the post-fitting adjustments to hearing instruments may be used as a basis for generating training data for a ML model that predicts whether a user of one or more hearing instruments is likely to need additional support from a hearing professional during the process of refining the settings of the hearing instruments. For instance, the user may need extra help from a hearing professional to ensure that the refinement process reaches a quick and satisfactory conclusion. Based on a determination that the user is likely to need additional support, the processing system may alert one or more hearing professionals to help the user. Because the ML model may be trained based on data regarding post-fitting adjustments, the ML model may more accurately predict which users are likely to need additional support.

FIG. 1 is a conceptual diagram illustrating an example system 100 that includes hearing instruments 102A, 102B, in accordance with one or more aspects of this disclosure. This disclosure may refer to hearing instruments 102A and 102B collectively, as "hearing instruments 102." A user 104 may wear hearing instruments 102. In some instances, such as when user 104 has unilateral hearing loss, user 104 may wear a single hearing instrument. In other instances, such as when user 104 has bilateral hearing loss, the user may wear two hearing instruments, with one hearing instrument for each ear of user 104.

Hearing instruments 102 may comprise one or more of various types of devices that are configured to provide auditory stimuli to user 104 and that are designed for wear and/or implantation at, on, or near an ear of user 104. Hearing instruments 102 may be worn, at least partially, in the ear canal or concha. In any of the examples of this disclosure, each of hearing instruments 102 may comprise a hearing assistance device. Hearing assistance devices may include devices that help a user hear sounds in the user's environment. Example types of hearing assistance devices may include hearing aid devices, Personal Sound Amplification Products (PSAPs), and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the user's environment, such as recorded music, computer-generated sounds, sounds from a microphone remote from the user, or other types of sounds. For instance, hearing instruments 102 may include so-called "hearables," earbuds, earphones, or other types of devices. Some types of hearing instruments provide auditory stimuli to user 104 corresponding to sounds from the user's environment and also artificial sounds. In some examples, hearing instruments 102 may include cochlear implants. In some examples, hearing instruments 102 may use a bone conduction pathway to provide auditory stimulation.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains electronic components of the hearing instrument, including the receiver (e.g., a speaker). The receiver conducts sound to an earbud inside the ear via an audio tube. In some examples, one or more of hearing instruments 102 may be receiver-in-canal (RIC) hearing-assistance devices, which include a housing worn behind the ear that contains electronic components and a housing worn in the ear canal that contains the receiver.

Hearing instruments 102 may implement a variety of features that help user 104 hear better. For example, hearing instruments 102 may amplify the intensity of incoming sound, amplify the intensity of incoming sound at certain frequencies, translate or compress frequencies of the incoming sound, and/or perform other functions to improve the hearing of user 104. In some examples, hearing instruments 102 may implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help users understand conversations occurring in crowds or other noisy environments. In some examples, hearing instruments 102 may use beamforming or directional processing cues to implement or augment directional processing modes.

In some examples, hearing instruments 102 may reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wireless communication technologies. Example types of wireless communication technology include Near-Field Magnetic Induction (NFMI) technology, 900 MHz technology, a BLUETOOTH™ technology, WI-FI™ technology, audible sound signals, ultrasonic communication technology, infrared communication technology, inductive communication technology, or another type of communication that does not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 comprises one or more computing devices, each of which may include one or more processors. For instance, computing system 106 may comprise one or more mobile devices, server devices, personal computer devices, handheld devices, wireless access points, smart speaker devices, smart televisions, medical alarm devices, smart key fobs, smartwatches, smartphones, motion or presence sensor devices, smart displays, screen-enhanced smart speakers, wireless routers, wireless communication hubs, prosthetic devices, mobility devices, special-purpose devices, accessory devices, and/or other types of devices.

Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102. Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

Furthermore, in the example of FIG. 1, hearing instrument 102A includes a speaker 108A, a microphone 110A, a set of one or more processors 112A, and sensors 118A. Hearing instrument 102B includes a speaker 108B, a microphone 110B, a set of one or more processors 112B, and sensors 118A. This disclosure may refer to speaker 108A and speaker 108B collectively as "speakers 108." This disclosure may refer to microphone 110A and microphone 110B collectively as "microphones 110." Computing system 106 includes a set of one or more processors 112C. Processors 112C may be distributed among one or more devices of computing system 106. This disclosure may refer to processors 112A, 112B, and 112C collectively as "processors 112." Processors 112 may be implemented in circuitry and may comprise microprocessors, application-specific integrated circuits, digital signal processors, or other types of circuits.

As noted above, hearing instruments 102A, 102B, and computing system 106 may be configured to communicate with one another. Accordingly, processors 112 may be configured to operate together as a processing system 114. Thus, discussion in this disclosure of actions performed by processing system 114 may be performed by one or more processors in one or more of hearing instrument 102A, hearing instrument 102B, or computing system 106, either separately or in coordination.

Figure 8:
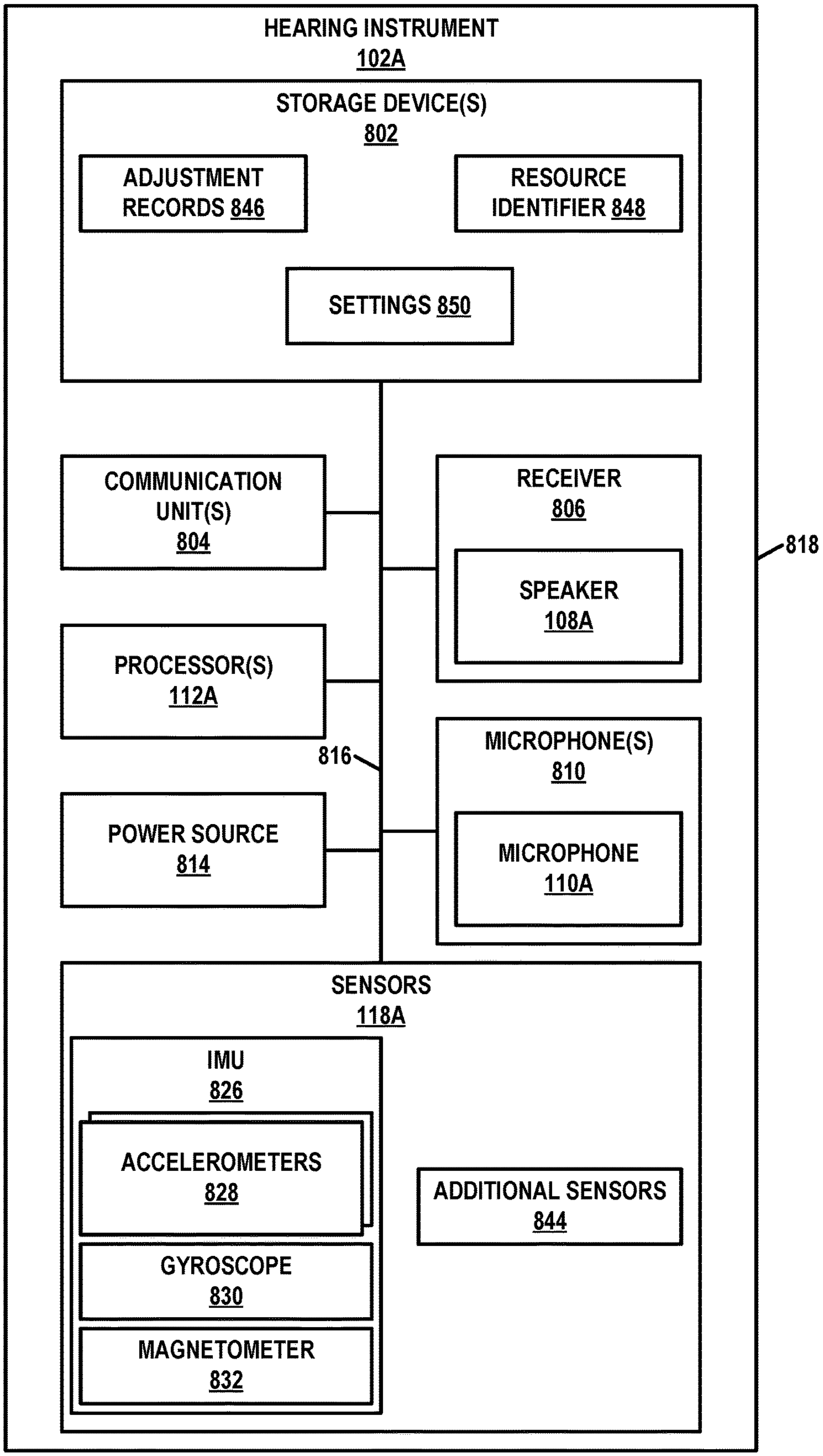
FIG. 8 is a block diagram illustrating example components of a hearing instrument, in accordance with one or more aspects of this disclosure.
Figure 9:
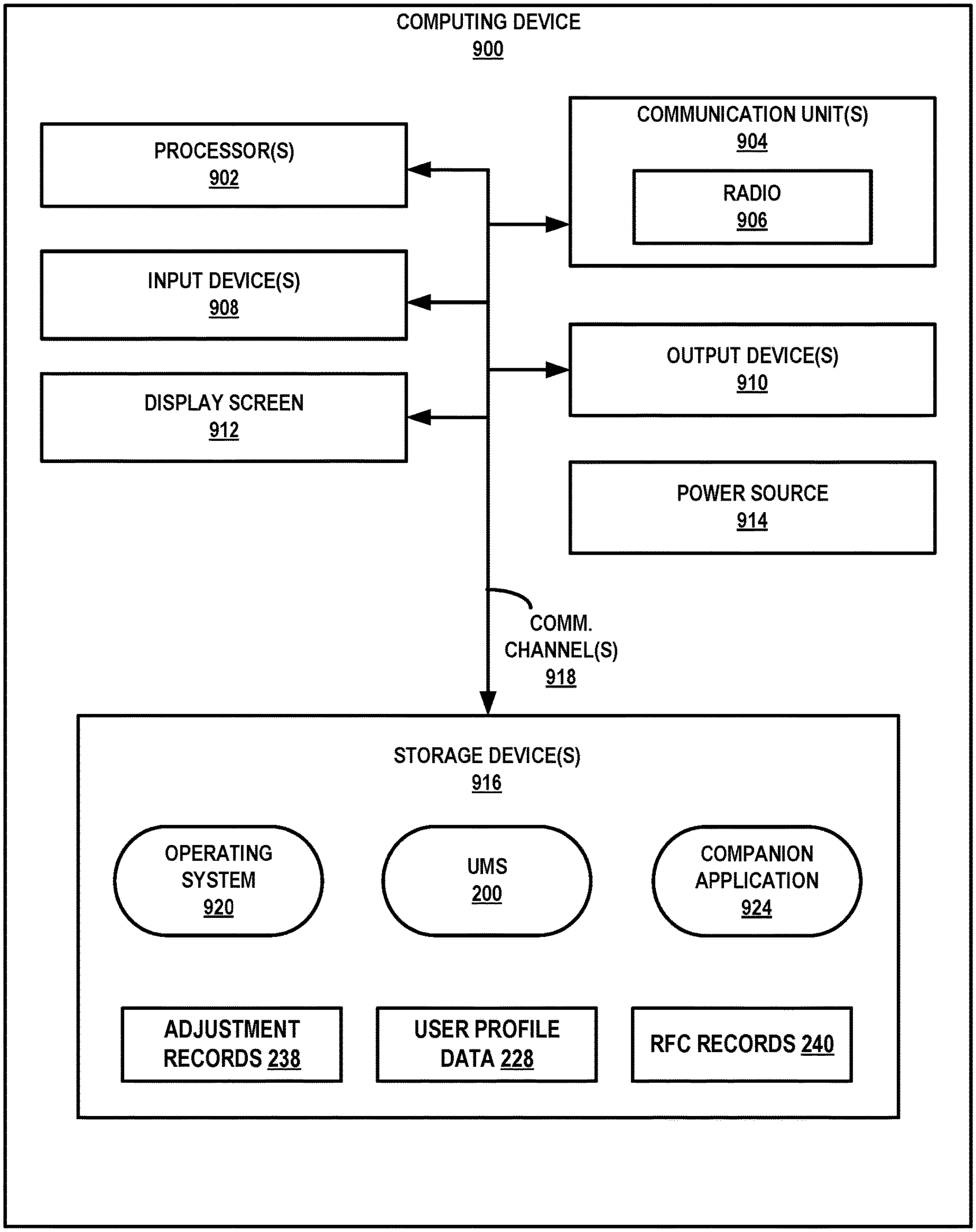
FIG. 9 is a block diagram illustrating example components of a computing device, in accordance with one or more aspects of this disclosure.

It will be appreciated that hearing instruments 102 and computing system 106 may include components in addition to those shown in the example of FIG. 1, e.g., as shown in the examples of FIG. 8 and FIG. 9. For instance, each of hearing instruments 102 may include one or more additional microphones configured to detect sound in an environment of user 104. The additional microphones may include omnidirectional microphones, directional microphones, or other types of microphones.

Speakers 108 may be located on hearing instruments 102 so that sound generated by speakers 108 is directed medially through respective ear canals of user 104. For instance, speakers 108 may be located at medial tips of hearing instruments 102. The medial tips of hearing instruments 102 are designed to be the most medial parts of hearing instruments 102. Microphones 110 may be located on hearing instruments 102 so that microphones 110 may detect sound within the ear canals of user 104.

Furthermore, hearing instrument 102A may include sensors 118A. Similarly, hearing instrument 102B may include sensors 118B. This disclosure may refer to sensors 118A and sensors 118B collectively as sensors 118. For each of hearing instruments 102, one or more of sensors 118 may be included in in-ear assemblies of hearing instruments 102. In some examples, one or more of sensors 118 are included in behind-the-ear assemblies of hearing instruments 102 or in cables connecting in-ear assemblies and behind-the-ear assemblies of hearing instruments 102. Although not illustrated in the example of FIG. 1, in some examples, one or more devices other than hearing instruments 102 may include one or more of sensors 118.

In some examples, in-ear assembly includes all components of hearing instrument 102A. Similarly, in some examples, in-ear assembly includes all components of hearing instrument 102B. In other examples, components of hearing instrument 102A may be distributed between in-ear assembly and another assembly of hearing instrument 102A. For instance, in examples where hearing instrument 102A is a RIC device, in-ear assembly may include speaker 108A and microphone 110A and in-ear assembly may be connected to a behind-the-ear assembly of hearing instrument 102A via a cable. Similarly, in some examples, components of hearing instrument 102B may be distributed between in-ear assembly and another assembly of hearing instrument 102B. In examples where hearing instrument 102A is an ITE, ITC, CIC, or IIC device, in-ear assembly may include all primary components of hearing instrument 102A. In examples where hearing instrument 102B is an ITE, ITC, CIC, or IIC device, in-ear assembly may include all primary components of hearing instrument 102B.

Hearing instruments 102 may have a wide variety of configurable settings. For example, the settings of hearing instruments 102 may include audiological settings that address hearing loss. Such audiological settings include gain levels for individual frequency bands, settings to control frequency compression, settings to control frequency translation, and so on. Other settings of hearing instruments 102 may apply various noise reduction filters to incoming sound signals, apply directional processing modes, and so on.

Different users may need their hearing instruments to use different settings for the users to attain satisfactory results. For example, because two different users may have different types of hearing loss, the settings of the hearing instruments for the two users may need to be different for the two users to have satisfactory results from their hearing instruments.

An initial fitting process is performed to set the settings of hearing instruments 102. Conventionally, during the initial fitting process, an audiogram-based prescription would be used to determine the settings of hearing instruments 102. In some examples, such as examples in which hearing instruments 102 are distributed over-the-counter, the initial fitting process may involve user selection of a set of settings from among a plurality of predefined sets of settings. As a basis for the initial settings, user 104 may obtain audiometric data that describes the hearing abilities of user 104.

The audiometric data may be obtained in various ways. For example, the audiometric data may be obtained using a crude hearing test or estimate of the hearing of user 104, such as an online test, questionnaire, by having hearing instruments 102 guide user 104 through a series of instructions to obtain hearing thresholds, or in another manner. In some examples, the audiometric data may be obtained by a trained hearing professional conducting a hearing test.

After the audiometric data is obtained, user 104 may need to integrate the audiometric data into the settings of hearing instruments 102. Because most hearing instrument users are naïve to the meaning of audiometric data (e.g., the symbols on a typical audiogram), it may be unrealistic to assume that these users could easily enter the audiometric data into fitting software that configures settings of hearing instruments 102. Even if instructions are provided to the users instructing them how to do this, manual entry of the audiometric data may be time consuming, tedious, and there may be many opportunities for error.

As a solution to this problem, user 104 may, in some examples, take a photo (or scan or other image) of hearing data. The hearing data may include audiometric data, such as data in an audiogram, air- and bone-conduction thresholds and uncomfortable loudness levels for the left and right ears at the audiometric frequencies that were tested, speech recognition scores, speech reception thresholds, signal-to-noise ratio loss, tympanometric data, loudness perception (e.g., most comfortable loudness, uncomfortable loudness, etc.) data or ratings, acoustic reflex and decay results, otoacoustic emission results, wideband reflectance results, tester comments, and other types of data regarding the hearing abilities of user 104. In some examples, the hearing data may include metadata such as a test date, equipment models, test materials, test location, presentation methods, audiologist name, license number and contact information, etc. Processing system 114 may convert the resulting image to text and extract the hearing data from the text.

Processing system 114 may then configure settings of hearing instruments 102 based on the hearing data. For instance, user 104 may take a picture (or scan a copy) of a piece of paper or screen (e.g., a photo of a screen or a screenshot) that shows their hearing data. In some examples, such pictures may be taken from within fitting software (e.g., the fitting software may prompt user 104 to take a photo of their hearing data), or they could upload an image that was previously taken and stored on their electronic device (e.g., a computer or a smart phone). Processing system 114 may convert the hearing data from an image to text using optical character recognition (OCR) software. Processing system 114 may pull audiometric data from the hearing data (e.g., an audiogram) into the fitting software. The fitting software could be an application on a computing device, such as a smart phone or tablet, or stand-alone software that is loaded onto a desktop or laptop computer. Processing system 114 may use logic that instructs the fitting software how to handle masked thresholds (i.e., whenever both unmasked and masked thresholds exist, the masked thresholds should be assumed to be the “true” thresholds). In some examples, processing system 114 may use logic that applies offsets based on the type of test that was conducted, e.g., Auditory Brainstem Response (ABR) thresholds. The audiometric data may be used to provide initial fitting settings (e.g., gain, compression and maximum output) to the hearing instrument wearer based on a standardized fitting formula.

Uploading a photo/scanned copy of hearing data and converting the resulting image into text may provide a fast and easy method for user 104 to upload their audiometric data (and other data) without having to know what symbols in the hearing mean, without the need for manual data entry, thus capturing a lot of data with reduced burden for user 104 and reduced chance of error.

Furthermore, in some examples, processing system 114 may analyze the audiometric data of user 104 for contraindications to a hearing instrument fitting. For example, if any of the following are observed, processing system 114 may recommend to user 104 that user 104 seek the opinion of a hearing professional before proceeding with the fitting:

a. Asymmetry in audiometric thresholds between the left and the right ears.
b. Air bone gap>10 dB at multiple audiometric frequencies.
c. Flat or high volume tympanograms.
d. Poorer than expected speech recognition scores for that hearing loss.
e. Abnormal reflexes or decay results.
f. Comments left by the professional about ear wax or other debris blocking the ear canal, fluid/drainage in the ear, dizziness, ear pain, ear surgeries or fluctuating or sudden hearing loss.
g. Hearing loss is outside the range of the product, or outside of the range allowed for over-the-counter products.

Because of the importance of the settings of hearing instruments 102 to the satisfaction of user 104 with hearing instruments 102, it may be important for the initial fitting process to determine the settings as correctly as possible. Nevertheless, the settings of hearing instruments 102 may still need to be adjusted after the initial fitting process is complete. In other words, post-fitting adjustments may be made to the settings of hearing instruments 102. For example, user 104 may wish to adjust the settings of hearing instruments 102 because the sound produced by hearing instruments 102 does not sound good in a particular environment, because user 104 is unable to adequately hear the voice of a particular conversation partner, or because of other reasons. Accordingly, user 104 may request a change to the settings of hearing instruments 102. For example, user 104 may visit a hearing professional, or otherwise interact with a hearing professional via a remote system, to request changes be made to the settings of hearing instruments 102. In some examples, user 104 may interact with a computerized system that attempts to automatically change the settings of hearing instruments 102 to improve the experience of user 104.

In accordance with one or more aspects of this disclosure, processing system 114 may implement a user management system (UMS) that utilizes a prescription-based approach to perform initial fitting processes and other functions. The UMS may generate training data based on post-fitting adjustments made to settings of a plurality of hearing instruments and based on profiles of users of the plurality of hearing instruments, wherein the post-fitting adjustments are made to the settings of the plurality of hearing instruments after initial uses of the plurality of hearing instruments. Furthermore, the UMS may train a machine learning (ML) model based on the training data to generate initial fitting suggestions. Prior to an initial use of a current hearing instrument (e.g., one of hearing instruments 102) by a current user (e.g., user 104), the UMS may generate an initial fitting suggestion for the current hearing instrument of the current user by applying the ML model to input that includes a profile of the current user. By generating the training data for the ML model based on the post-fitting adjustments, the ML model may generate better initial fitting suggestions than an initial fitting system that does not take post-fitting adjustments into account. Generating better initial fitting suggestions may improve the performance of hearing instruments 102, increase user satisfaction, and may reduce chances of user 104 returning hearing instruments 102 for monetary credit.

Figure 2:
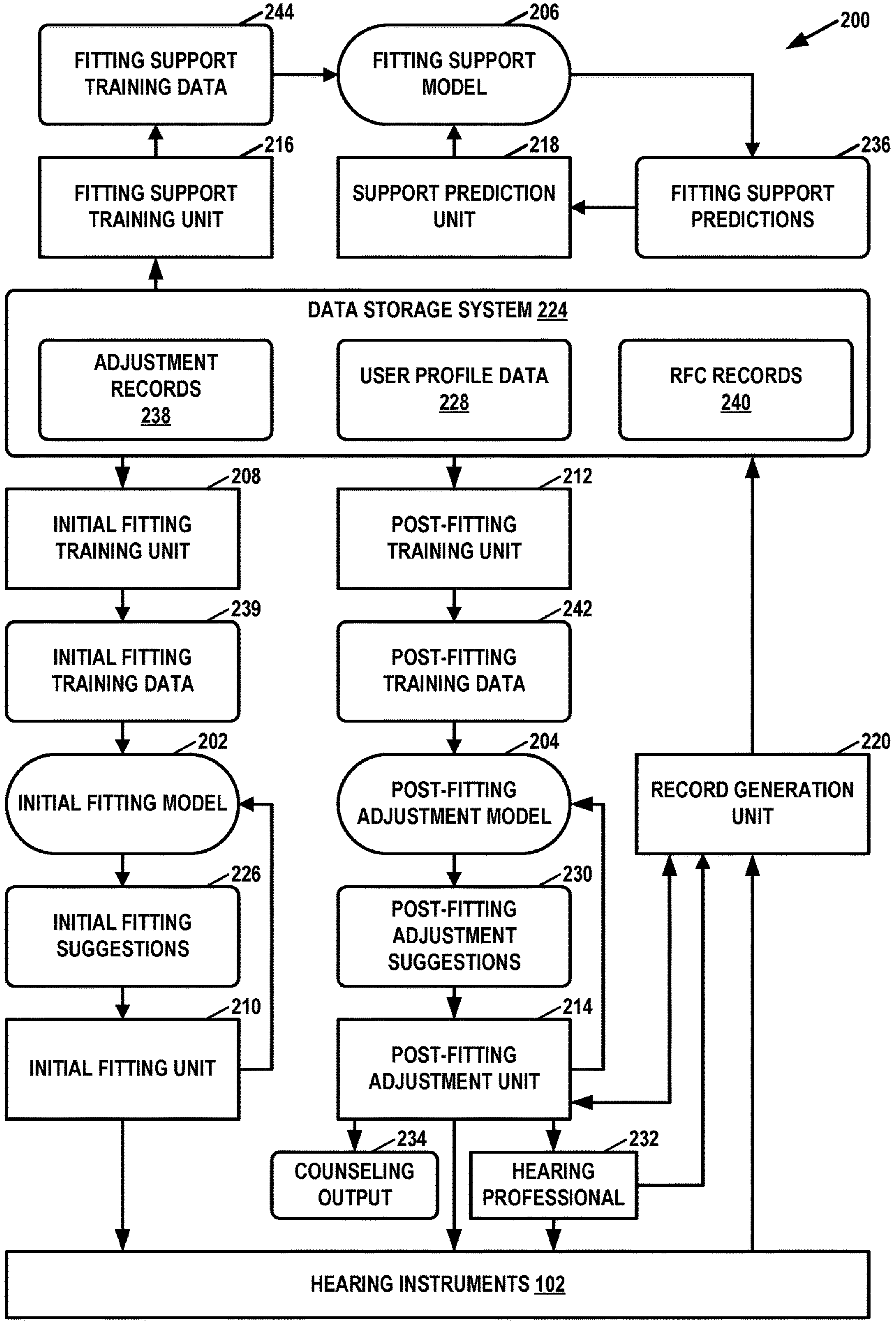
FIG. 2 is a conceptual diagram illustrating example components of a user management system (UMS), in accordance with one or more aspects of this disclosure.

FIG. 2 is a conceptual diagram illustrating example components of a UMS 200, in accordance with one or more aspects of this disclosure. In the example of FIG. 2, UMS 200 includes an initial fitting model 202, a post-fitting adjustment model 204, and a fitting support model 206. Each of initial fitting model 202, post-fitting adjustment model 204, and fitting support model 206 may be an ML model. Furthermore, UMS 200 may include an initial fitting training unit 208, an initial fitting unit 210, a post-fitting training unit 212, a post-fitting adjustment unit 214, a fitting support training unit 216, a support prediction unit 218, a record generation unit 220, and a data storage system 224. Other examples may include more, fewer, or different units. The units of UMS 200 may be implemented at least partially in computing system 106 (FIG. 1). In some examples, functionality of UMS 200 may be distributed among computing system 106, hearing instruments, and/or one or more other devices, such as programming devices. A cloud server system, such as computing system 106, separate from hearing instruments of users may include data storage system 224.

Initial fitting training unit 208 may train initial fitting model 202 to generate initial fitting suggestions 226. Initial fitting unit 210 may use initial fitting model 202 to generate initial fitting suggestions for individual users based on user profile data 228 stored in data storage system 224. The user profile data 228 for a user may include audiological information regarding the user, demographic information regarding the user, and/or other types of information regarding the user. The audiological information regarding the user may include information regarding hearing loss of the user. Initial fitting unit 210 may configure hearing instruments 102 based on the initial fitting suggestions. Initial fitting unit 210 may generate the initial fitting suggestions in direct-to-consumer fittings, such as with over-the-counter (OTC) hearing instruments, or as an assistive feature for hearing professionals (e.g., audiologists, hearing technicians, etc.) fitting hearing instruments.

After initial fitting, record generation unit 220 may detect actions of user 104 that indicate that user 104 may want to adjust the settings of hearing instruments 102. In other words, record generation unit 220 may detect that user 104 has a complaint. For example, record generation unit 220 may detect an explicit action of user 104 that indicates that user 104 wants to adjust the settings of hearing instruments 102.

In one example of an explicit action of user 104 that indicates that user 104 wants to adjust the settings of hearing instruments 102, user 104 may make a verbal complaint about the current settings of hearing instruments 102. The verbal complaint may initially be detected by microphones of hearing instruments 102 or another device. Voice recognition and natural language processing via a personal voice assistant can be used to capture the user complaint directly when user 104 initiates a request using a user control on a hearing instrument and/or a compatible application on a device, such as a smart phone or tablet. An example of a verbal complaint about the current settings of hearing instruments 102 may include "I can't hear my partner in this restaurant," "everything sounds tinny right now," "everything is always too quiet," and so on. In some examples where user 104 makes a verbal complaint about the current settings of hearing instruments 102, record generation unit 220 may implement a natural language processing system that interprets the voice of user 104. In some examples, record generation unit 220 may determine that user 104 has a complaint based on user 104 using a user control (e.g., a button), based on user 104 making an adjustment to one or more settings of hearing instruments 102 (e.g., via a companion application of a smartphone or tablet), or in response to other actions of user 104.

In another example of an explicit action of user 104 that indicates that user 104 wants to adjust the settings of hearing instruments 102, a computer interface, such as a graphical user interface of an application or webpage, may receive indications of user input indicating that user 104 wants to adjust the settings of hearing instruments 102. For instance, an application ("app") running on a mobile phone of user 104 may include an interface that allows user 104 to input a complaint. In some examples, the user may initiate a complaint by completing an on-demand multiple choice survey available on a device, such as a smartphone, tablet, computer, accessory device, or other type of device. The device may receive indications of user input indicating answers to questions in the multiple-choice survey.

In an example of an implicit action of user 104 to generate a complaint, record generation unit 220 may detect that the actions of user 104 implicitly indicate that user 104 has a complaint. For example, record generation unit 22 may determine that user 104 has a complaint based on detection of a pattern of user 104 switching between setting profiles (i.e., programs) but not staying with any program for longer than a given time period, frequent activation and immediate deactivation of edge mode, frequent changes to volume control, customization or creation of custom profiles that are not used, using a remote microphone accessory in particular settings or times, and so on. Edge mode is an example of a feature of some hearing instruments that involves a user action for activation via user controls (e.g., via an application), a detection of environment and the provision of an adaptation for that environment considering the assumed or explicit intent of user 104 (when available via the application) in the environment. In some examples, record generation unit 220 may monitor, with, in some examples, explicit permission of the user, usage of hearing-related applications on the user's devices (e.g., smartphones, tablets, etc.) to determine whether the user may have a complaint. For example, a mobile phone may have a live listen feature that allows user 104 to use the microphone of the mobile phone to listen to the audio in the surrounding area. If user 104 uses the live listen feature every time user 104 is in a restaurant, that may suggest that the settings programmed for user 104 are not adequate for a restaurant environment. This example may also apply in cases other than live listen, such as when a dedicated remote microphone accessory is used or when a telecoil or induction loop setting of a hearing instrument is used.

Based on record generation unit 220 detecting actions of user 104 that indicate that user 104 has a new complaint, record generation unit 220 may generate an adjustment record. The adjustment record may include subjective data describing the complaint of user 104 (e.g., too loud, too noisy, unable to hear partner, etc.) as subjectively perceived by user 104. The adjustment record may also include objective complaint data in the adjustment record. The objective complaint data may include acoustic environment data regarding the current acoustic environment of user 104. Record generation unit 220 may obtain the acoustic environment data from hearing instruments 102, one or more accessory devices, or other types of devices. The acoustic environment data may include data regarding noise levels, information regarding the voice that user 104 is trying to hear, and so on.

Based on record generation unit 220 detecting that user 104 wants to adjust the settings of hearing instruments 102, record generation unit 220 may prompt post-fitting adjustment unit 214 to perform a post-fitting adjustment process. In some examples, as part of the post-fitting adjustment process, post-fitting adjustment unit 214 may use post-fitting adjustment model 204 to generate post-fitting adjustment suggestions 230.

In some examples, post-fitting adjustment unit 214 may directly configure hearing instruments 102 based on the post-fitting adjustment suggestions 230. Thus, in examples where post-fitting adjustment unit 214 directly configures hearing instruments 102, recommended post-fitting adjustments may be applied automatically, with the consent of user 104. In some examples, user 104 would receive the recommended post-fitting adjustment in the form of a pop-up on the application previously used to initiate a request for an adjustment (e.g., a complaint), via a text message, or in another manner. Upon receiving an indication of the post-fitting adjustment, the application may receive indications of user input from user 104 to store the post-fitting adjustment in a menu to be retrieved later or may receive an indication of user input to try to post-fitting adjustment immediately. In some examples, after the post-fitting adjustments have been applied to hearing instruments 102, the application may receive an indication of user input to save or discard the post-fitting adjustment. In some examples, the application may administer a feedback survey to user 104 after the post-fitting adjustments have been applied to hearing instruments 102. In cases where the application received indications of user input to discard the post-fitting adjustment, post-fitting adjustment unit 214 may provide, with the consent of user 104, an alternate post-fitting adjustment to the settings of hearing instruments 102.

In some examples, to configure hearing instruments 102, UMS 200 may provide values of the settings to a programming device that is configured to communicate with hearing instruments 102. Example types of programming devices may include smartphones, tablets, personal computers, accessory devices (e.g., charging cases, media streamer devices, etc.), special purpose devices, and other types of devices. The programming device communicates with hearing instruments 102 to configure hearing instruments 102 based on the values of the settings.

In some examples, post-fitting adjustment unit 214 may use post-fitting adjustment model 204 to generate post-fitting adjustment suggestions 230 to settings of hearing instruments 102 after an initial fitting of hearing instruments 102 without record generation unit 220 determining that user 104 has a complaint. In other words, post-fitting adjustment unit 214 may use post-fitting adjustment model 204 to make adjustments to the hearing instrument settings in a period after the initial fitting to fine-tune the hearing instrument settings not directly triggered by a complaint. For example, fitting adjustment unit 214 may use post-fitting adjustment model 204 to periodically make adjustments to the hearing instrument settings in the period after the initial fitting to help user 104 decide whether other hearing instrument settings may be better for user 104 than current settings of the hearing instrument.

In some examples, post-fitting adjustment unit 214 may output the post-fitting adjustment suggestions 230 to a hearing professional 232. Hearing professional 232 may review the post-fitting adjustment suggestions 230 and determine whether to adjust the settings of hearing instruments 102 based on the post-fitting adjustment suggestions 230. Hearing professional 232 does not form part of UMS 200. Post-fitting adjustment unit 214 may adjust the settings of hearing instruments 102 based on an indication that hearing professional 232 has accepted the post-fitting adjustment suggestion 230. In some examples, post-fitting adjustment unit 214 may receive an indication that hearing professional 232 prefers alternative post-fitting adjustments that are different from the post-fitting adjustment suggestion 230. In such examples, post-fitting adjustment unit 214 may adjust the settings of hearing instruments 102 based on the alternative post-fitting adjustments.

Post-fitting adjustment unit 214 may store data describing the post-fitting adjustment in data storage system 224. For instance, post-fitting adjustment unit 214 may store data describing the post-fitting adjustment in an adjustment record corresponding to the complaint. In this way, the adjustment record may include data describing a subjective description of the complaint, objective data regarding the complaint, and/or data describing a post-fitting adjustment that was made to address the complaint.

In some examples, record generation unit 220 provides an interface (e.g., voice interface, graphical user interface (GUI), etc.) that enables hearing professional 232 to review data in the adjustment records and user profile data associated with a user associated with the complaint. For example, the interface may enable hearing professional 232 to review the subjective and objective complaint data. In some examples, the interface may also enable hearing professional 232 to review post-fitting adjustment suggestions 230 generated by post-fitting adjustment model 204. In some examples, post-fitting adjustment unit 214 does not use any post-fitting adjustment model to generate post-fitting adjustment suggestions, and hearing professional 232 may determine post-fitting adjustments on their own.

In some examples, the interface of record generation unit 220 may enable hearing professional 232 to input clinician interpretation data. The clinician interpretation data may also be referred to herein as "chart notes." The clinician interpretation data may include data describing an interpretation of hearing professional 232 of the complaint of user 104. For example, record generation unit 220 may receive indications of user input from hearing professional 232 indicating the interpretation of hearing professional 232 of the complaint of user 104. Post-fitting adjustment unit 214 may store the clinician interpretation data in data storage system 224. For instance, record generation unit 220 may store the clinician interpretation data in an adjustment record associated with the complaint. In this way, the clinician interpretation data may be associated with the complaint. Thus, the adjustment record may include data describing one or more of a subjective description of the complaint, objective data regarding the complaint, data describing a post-fitting adjustment (e.g., an adjustment after initial fitting that was made to address the complaint or otherwise), and the clinician interpretation data.

In some examples, record generation unit 220 may include tools for helping hearing professional 232 interpret the complaint of user 104 and generate post-fitting adjustments for user 104. For example, the data stored in data storage system 224 may act as a repository of one or more hearing professionals' actions in response to user complaints. In this example, adjustment records 238 and user profile data 228 may serve as action-complaint units that may be associated with specific types of hearing loss or hearing profiles and activity descriptions along with acoustic characterizations of acoustic environments. Record generation unit 220 may enable hearing professional 232 to review non-personally identifying data from data storage system 224 to gather ideas on how to generate a post-fitting adjustment in response to the complaint of user 104. In some examples, hearing professional 232 may search for adjustment records of a specific user (e.g., user 104 or another user) and apply adjustments based on the previous adjustment record.

For example, post-fitting adjustment unit 214 may analyze adjustment records 238 and user profile data 228 in data storage system 224 to determine common professional advice (e.g., common post-fitting adjustments) associated with user complaints. For instance, post-fitting adjustment unit 214 may analyze adjustment records 238 and user profile data 228 to identify users with a similar profile to user 104 and who have complaints similar to user 104. Post-fitting adjustment unit 214 may determine similarity of users based on comparisons of patient-specific hearing loss data, duration of hearing loss, experience with hearing instruments, age of user, and an acoustic and physical activity, behavior of the users, self-assessment measures, noise tolerances, loudness growth curves, motivations, perceived self-efficacy, and so on. Post-fitting adjustment unit 214 may determine similarity of complaints by comparing subjective descriptions of complaints, objective data regarding complaints, and/or clinician interpretation of complaints. Thus, in some examples, based on matches to a combination of the above-mentioned criteria, post-fitting adjustment unit 214 may generate a list of possible actions, i.e., potential post-fitting adjustments. Post-fitting adjustment unit 214 may generate the list of possible actions based on the post-fitting adjustment data. Both data storage system 224 and the list of possible actions would continually evolve based on patient and professional feedback, improvement of decoders (e.g., decoders used for estimating noise floor and other environment statistics based on which acoustic environment is estimated), improved estimation of acoustic environment and data regarding usage of hearing instruments 102.

In some examples, hearing professional 232 and/or post-fitting adjustment model may recommend use of an accessory device, such as a remote microphone, to address the complaint of user 104. In some such examples, post-fitting adjustment unit 214 may provide user 104 with an option to order the recommended accessory device. The accessory device may be delivered to an office of hearing professional, or another location, where the accessory device may be fitted for use by user 104. In some examples, hearing professional 232 and/or post-fitting adjustment model may recommend use of hearing instruments that include a telecoil or magnetic sensor hardware (and, in some such examples, may order a replacement device accordingly). In some examples, initial fitting suggestions 226 may indicate (e.g., based on user profile data 228) that user 104 should use hearing instruments that include a telecoil or magnetic sensor hardware.

In some examples, post-fitting adjustment unit 214 may generate counseling output 234 based on the post-fitting adjustment suggestions 230. Counseling output 234 may include information that counsels a user (e.g., a user of hearing instruments 102 or another person) on how to adjust settings of hearing instruments 102. In some examples, counseling output may include an email message, in-application message, text message, or other type of message. In some examples, counseling output 234 may include information other than or in addition to information that counsels the user how to adjust settings of hearing instruments 102. For instance, counseling output 234 may include information about communication skills to use in various listening environments when combined with a particular setting that was provided. In some examples, post-fitting adjustment model 204 is unable to generate a post-fitting adjustment suggestion to address the complaint of user 104. For instance, if a confidence level of a post-fitting adjustment suggestion is below a threshold, post-fitting adjustment unit 214 may determine that post-fitting adjustment model 204 is unable to generate a post-fitting adjustment suggestion. Likewise, hearing professional 232 may be unable to determine an appropriate post-fitting adjustment. Based on there being no appropriate post-fitting adjustment, post-fitting adjustment unit 214 may provide counseling output 234 to user 104 that includes professional quality advice or tips, e.g., via a pop-up on an application previously used to initiate the complaint, via a text message, or in some other manner. In some examples, user 104 may have the option to email a detailed explanation to themselves if user 104 so chooses. In some examples, post-fitting adjustment unit 214 may receive an indication of user input from hearing professional 232 indicating whether generation of counseling output 234 is activated for user 104.

As shown in the example of FIG. 2, data storage system 224 may store adjustment records 238. An adjustment record may include data describing a post-fitting adjustment to the settings of one or more hearing instruments of a user. The adjustment records 238 stored in data storage system 224 may include data describing post-fitting adjustments to the settings of hearing instruments of many users. Post-fitting adjustment unit 214 may generate the data describing the post-fitting adjustments to the settings of the hearing instruments of a user. For example, if post-fitting adjustment unit 214 uses a post-fitting adjustment suggestion 230 generated by post-fitting adjustment model 204 to adjust the settings of hearing instruments 102, post-fitting adjustment unit 214 may generate data describing this post-fitting adjustment. In some examples where post-fitting adjustment unit 214 provides a post-fitting adjustment suggestion 230 to hearing professional 232, post-fitting adjustment unit 214 may generate data describing the post-fitting adjustment in response to receiving an indication that hearing professional 232 has accepted the post-fitting adjustment suggestion 230.

As mentioned above, initial fitting training unit 208 may train initial fitting model 202 based on post-fitting adjustments. As part of a process to train initial fitting model 202, initial fitting training unit 208 may generate initial fitting training data 239 based on the post-fitting adjustments and based on user profile data 228.

In some examples, as part of generating initial fitting training data 239, initial fitting training unit 208 may perform a data cleaning process. As part of the data cleaning process, initial fitting training unit 208 may identify users who are not associated with post-fitting adjustments and users associated with post-fitting adjustments. For purposes of training initial fitting model 202, initial fitting training unit 208 may discard data regarding users for whom no adjustments were made to the settings of their hearing instruments. On the other hand, initial fitting training unit 208 may include data regarding users for whom adjustments were made to the settings of their hearing instruments in initial fitting training data 239. In some examples, AutoREM data will be captured and instead of selecting cloud data based on deviation from Best Fit, the selection could be made based on deviation from AutoREM match-to-target. AutoREM is an automated procedure to verify hearing instrument gains in situ. When real-ear measures (REM) are used, audiologists typically make adjustments to the gains and try to match the hearing instrument response to the prescribed gains (i.e., targets). This may result in slightly different gains than what the system might automatically give as the "Best Fit," given inter-individual difference in ear geometry.

Initial fitting training data 239 may include fitting data (e.g., gain settings, hearing aid feature selection, etc.), patient/device characteristics from user profile data 228 (e.g., audiometric thresholds, new/experienced user, hearing instrument style), and whether a fitting was successful (not return-for-credit (RFC)) or not (RFC) from RFC records 240, and/or other types of data. For example, initial fitting training data 239 may include training data pairs. The training data pairs may correspond to different users. Each training data pair includes an input dataset for a user and a target dataset for the same user. The input dataset includes information that is provided as input to initial fitting model 202. The target dataset includes information that initial fitting training unit 208 may compare to the output data generated by initial fitting model 202 when initial fitting model 202 is provided the input dataset for the training data pair.

The input dataset of a training data pair for a user may include information from user profile data 228 for the user. For example, the input dataset of a training data pair for a user may include audiological information (e.g., hearing thresholds) of the user, device information regarding the hearing instruments used by the user, the experience level of the user, information about the physical activities of the user, information about medical conditions of the user, and so on.

Initial fitting training unit 208 may determine the target dataset of a training data pair for a user based on the adjustment records 238 for the user. For instance, initial fitting training unit 208 may analyze the adjustment records 238 for the user to determine final values of settings of the hearing instruments of the user. For instance, initial fitting training unit 208 may determine the values of the settings indicated in post-fitting adjustment data of the adjustment record.

In some examples where the user profile data for the user includes data indicating levels of satisfaction with the hearing instruments, initial fitting training unit 208 does not generate a target dataset based on an adjustment record if the level of satisfaction with the hearing instruments declined after application of the corresponding post-fitting adjustment to the settings of the user's hearing instruments. In some examples where the user profile data for the user includes data indicating amounts of time the user spends wearing the hearing instruments, initial fitting training unit 208 does not generate a target data based on an adjustment record if the amount of time the user spends wearing the hearing instruments declined after application of the corresponding post-fitting adjustment to the settings of the user's hearing instruments.

In examples where initial fitting model 202 is implemented as an artificial neural network, initial fitting training unit 208 may apply initial fitting model 202 using the input dataset of a training data pair. Initial fitting model 202 may compare the resulting output generated by initial fitting model 202 with the target data of the training data pair. Initial fitting training unit 208 may perform a backpropagation process based on the differences between the output generated by initial fitting model 202 and the target data of the training data pair. The backpropagation process may update values of weights or other parameters of the artificial neural network to reduce differences between the output generated by initial fitting model 202 and the target data of the training data pair. Initial fitting training unit 208 may repeat this process with a first subset of the training data pairs and may validate initial fitting model 202 with a second subset of the training data pairs.

Post-fitting training unit 212 may train post-fitting adjustment model 204 to generate post-fitting adjustment suggestions 230. In this way, post-fitting training unit 212 may train and validate a machine learning model to provide optimized fine-tuning of hearing instruments after a user has been fit with their hearing instruments and has started wearing their hearing instruments in the field.

In some examples, post-fitting training unit 212 may use data in data storage system 224, such as data regarding user complaints and professional actions to address those complaints, chart notes (including specific complaints, adjustments, and outcomes), field use experienced by different hearing instrument users (e.g., average input level, % of time in noise, characteristics of the surrounding environment at the time of a reported complaint or temporary adjustment such as volume control change) and/or information about the patient (e.g., patient age, sex, weight, hearing loss configuration, results from previous tests, previous adjustments), the hearing instrument, and the hearing instrument settings. Once trained and validated, post-fitting adjustment unit 214 may use post-fitting adjustment model 204 to fine-tune the hearing instrument fitting for a given individual user based on not only their patient/device characteristics, but also the acoustic environments to which the user is exposed. Training of post-fitting adjustment unit 214 may occur on a periodic basis, on an event-driven basis, in response to input from an administrator of UMS 200, or in other ways.

Similar to how initial fitting training unit 208 generates initial fitting training data 239, post-fitting training unit 212 may generate post-fitting training data 242. As part of the process to generate post-fitting training data 242, post-fitting training unit 212 may perform a data cleaning process. As part of performing the data cleaning process, post-fitting training unit 212 may filter out users, based on RFC records 240, who have returned their hearing instruments. During the data cleaning process, post-fitting training unit 212 may analyze the adjustment records 238 of the users who did not return their hearing instruments to identify adjustment records 238 that improved one or more user satisfaction metrics (e.g., subjective user satisfaction, time spent using hearing instruments, etc.).

Based on these adjustment records, post-fitting training unit 212 may generate training data pairs for users. Each of the training data pairs may include an input dataset and a target dataset. The input dataset of a training data pair for a user may include data from a user profile of the user and an adjustment record of the user. For example, the input dataset may include audiological information (e.g., hearing thresholds) of the user, device information regarding the hearing instruments used by the user, the experience level of the user, information about the physical activities of the user, information about medical conditions of the user, information about acoustic environments of the user (e.g., average input level, percentage of time in noise, etc.), subjective complaint data of the adjustment record, objective complaint data of the adjustment record, clinical interpretation data of the adjustment record, and/or other types of data. Thus, the input dataset of a training data pair used for training post-fitting adjustment model 204 may include information that characterizes a complaint of the user in addition to other information about the user. The target dataset of the training data pair of a user may include the post-fitting adjustment data of the adjustment record.

In examples where post-fitting adjustment model 204 is implemented as an artificial neural network, post-fitting training unit 212 may apply post-fitting adjustment model 204 using the input dataset of a training data pair. Post-fitting adjustment model 204 may compare the resulting output generated by post-fitting adjustment model 204 with the target data of the training data pair. Post-fitting training unit 212 may perform a backpropagation process based on the differences between the output generated by post-fitting adjustment model 204 and the target data of the training data pair. The backpropagation process may update values of weights or other parameters of the artificial neural network to reduce differences between the output generated by post-fitting adjustment model 204 and the target data of the training data pair. Post-fitting training unit 212 may repeat this process with a first subset of the training data pairs and may validate post-fitting adjustment model 204 with a second subset of the training data pairs.

Fitting support training unit 216 may train fitting support model 206 to generate fitting support predictions 236 for users. A fitting support prediction for a user indicates whether the user is likely to require additional support to properly configure their hearing instruments, or whether only standard support is likely to be needed for proper configuration of the user's hearing instruments. Support prediction unit 218 may use fitting support model 206 to generate fitting support predictions 236. If a fitting support prediction indicates that user 104 may need additional support, support prediction unit 218 may generate a message to hearing professional 232 or another person indicating that user 104 may need additional support. This message may encourage hearing professional 232 to provide the additional support to user 104. In some examples, if the fitting support prediction indicates that user 104 may need additional support, support prediction unit 218 may generate a message to user 104 indicating that user 104 may need additional support. Support prediction unit 218 may generate the message to user 104 before user 104 purchases the hearing instruments 102. In this way, the message may help user 104 decide whether to purchase hearing instruments in an over-the-counter or direct-to-consumer distribution channel, or whether to obtain hearing instruments through a hearing professional.

Fitting support training unit 216 may train fitting support model 206 based on data stored in data storage system 224. For example, fitting support training unit 216 may train fitting support model 206 based on one or more of adjustment records 238, user profile data 228, or return-for-credit (RFC) records 240 stored in data storage system 224. RFC records 240 indicate whether users returned hearing instruments for credit. Typically, a user returns a set of hearing instruments for credit if the user is unsatisfied with the performance of the hearing instruments, which is often because settings of the hearing instruments were not appropriately configured for the user.

In some examples, fitting support training unit 216 may determine, based on adjustment records 238 whether post-fitting adjustments were made to the settings of the hearing instruments of users. Making post-fitting adjustments to the settings of the hearing instruments of a user is an indication of an attempt to optimize the settings of the hearing instruments of the user.

Fitting support training unit 216 may use data in data storage system 224 to generate fitting support training data 244. As part of the process to generate fitting support training data 244, fitting support training unit 216 may generate training data pairs for users. Each of the training data pairs may include an input dataset and a target dataset. The input dataset of a training data pair for a user may include data from a user profile of the user and an adjustment record of the user. For example, the input dataset may include audiological information (e.g., hearing thresholds) of the user, device information regarding the hearing instruments used by the user, the experience level of the user, information about the physical activities of the user, information about medical conditions of the user, information about the acoustic environment of the user (e.g., average input level, percentage of time in noise, etc.) and/or other types of data.

To generate the target dataset of the training data pair for a user, fitting support training unit 216 may analyze adjustment records 238 for the user and user profile data 228 for the user. In some examples, fitting support training unit 216 may generate the target dataset based on the number of adjustment records 238 associated with the user. For instance, based on adjustment records 238 for the user indicating that the number of post-fitting adjustments associated with the user is greater than a particular threshold, fitting support training unit 216 may generate the target dataset so that the target dataset indicates that the additional support may be needed. Otherwise, if the number of post-fitting adjustments associated with the user is not greater than the particular threshold, fitting support training unit 216 may generate the target dataset so that the target dataset indicates that additional support is not needed. In some examples, fitting support training unit 216 may generate the target dataset based on RFC records 240. For instance, based on RFC records 240 indicating that the user returned their hearing instruments, fitting support training unit 216 may generate the target dataset to indicate that additional support may be needed. Otherwise, if the user did not return their hearing instruments, fitting support training unit 216 may generate the target dataset so that the target dataset indicates that additional support is not needed.

In examples where fitting support model 206 is implemented as an artificial neural network, fitting support training unit 216 may apply fitting support model 206 using the input dataset of a training data pair. Fitting support model 206 may compare the resulting output generated by fitting support model 206 with the target data of the training data pair. Fitting support training unit 216 may perform a backpropagation process based on the differences between the output generated by fitting support model 206 and the target data of the training data pair. The backpropagation process may update values of weights or other parameters of the artificial neural network to reduce differences between the output generated by fitting support model 206 and the target data of the training data pair. Fitting support training unit 216 may repeat this process with a first subset of the training data pairs and may validate fitting support model 206 with a second subset of the training data pairs.

Figure 3:
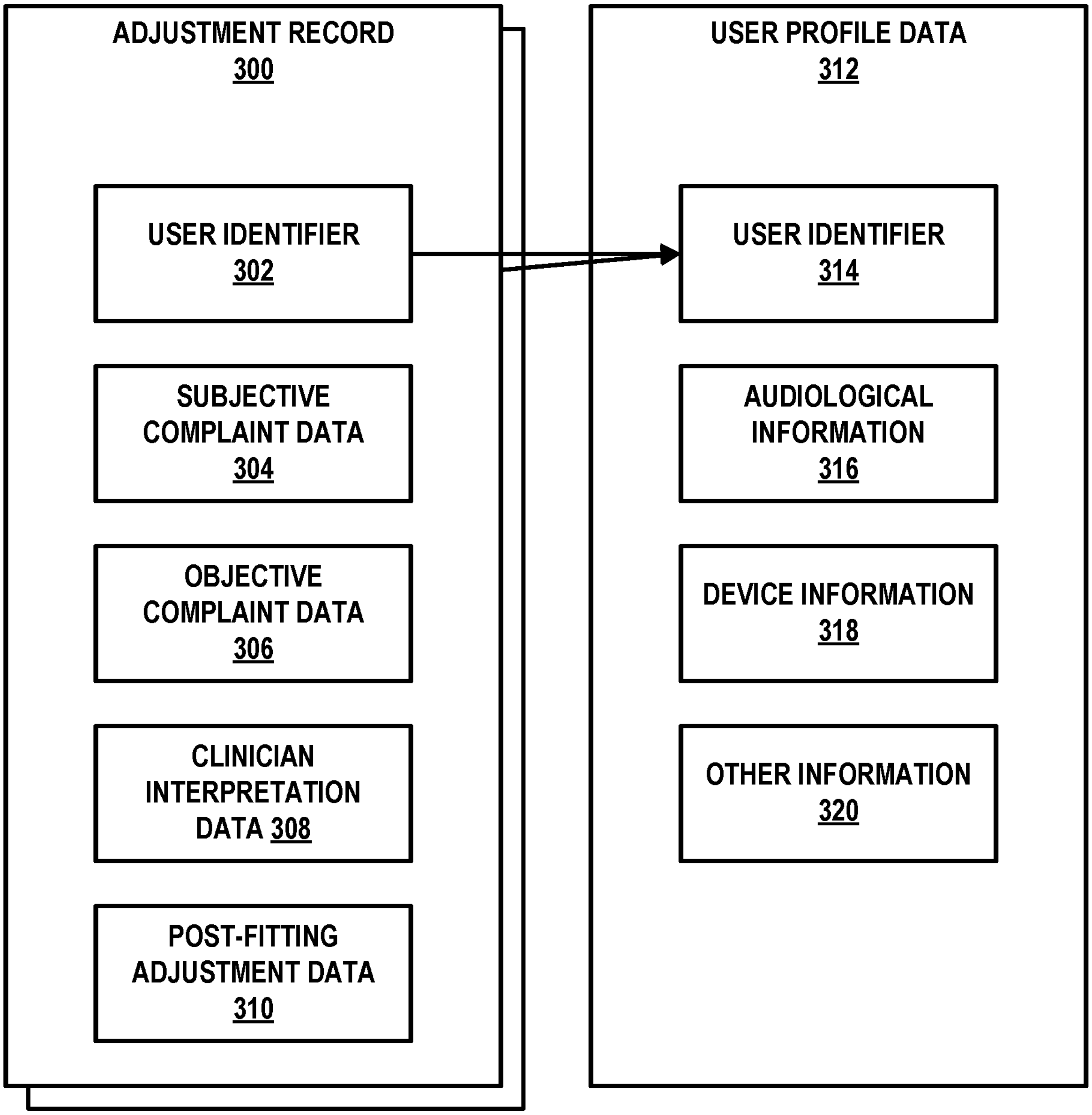
FIG. 3 is a conceptual diagram illustrating example adjustment records and user profile data, in accordance with one or more aspects of this disclosure.

FIG. 3 is a conceptual diagram illustrating example adjustment records and user profile data, in accordance with one or more aspects of this disclosure. Each of adjustment records may correspond to a different post-fitting adjustment to one or more hearing instruments of a user (e.g., user 104). The user profile data includes information about a user and hearing instruments of the user.

In the example of FIG. 3, an adjustment record 300 may include a user identifier 302, subjective complaint data 304, objective complaint data 306, clinician interpretation data 308, and post-fitting adjustment data 310. User identifier 302 may identify a user (e.g., user 104) associated with adjustment record 300. Subjective complaint data 304 may describe a subjective complaint of the user that led to the post-fitting adjustment. Subjective complaint data 304 may include text describing the complaint. Record generation unit 220 may receive spoken or written indications of the subjective complaint of the user (e.g., from the user or another person) and generate the text describing the complaint. In some examples, the subjective complaint data may include quantitative data describing the user's subjective experience. For instance, record generation unit 220 may receive responses to yes/no questions, selections from multiple-choice questions, selections of numeric values, and so on. As an example of a selection of a numeric value, record generation unit 220 may receive an indication of a response to question such as, "one a scale of 1 to 10, where 1 corresponds to overly bass-heavy (e.g., "boomy") sound and 10 corresponds to overly treble-heavy (e.g., "tinny") sound, how would you rate the sound generated by your hearing instruments?"

Objective complaint data 306 may include objective data associated with the complaint. Examples of objective data associated with the complaint may include acoustic environment data describing an acoustic environment of the hearing instruments when the user had a problem with the hearing instruments that gave rise to the complaint. Other examples of objective data associated with the complaint may include data regarding which features of the hearing instrument (e.g., noise reduction filters, directional processing modes, etc.) or accessories were in use when the user had the problem with the hearing instrument that gave rise to the complaint. In some examples, objective complaint data 306 may include usage logs of hearing instruments 102, data characterizing listening environments user 104 is engaged in, user activity data, and/or other types of objective data associated with the complaint. In some examples, objective complaint data 306 may include information indicating abnormal movements of user 104, information indicating stress levels of user 104, Clinician interpretation data 308 may describe a hearing professional's interpretation of the complaint of the user. In some examples, clinician interpretation data 308 may include text describing written notes of the hearing professional regarding the complaint of the user. In some examples, clinician interpretation data 308 may include structured data, e.g., selections by the hearing professional from multiple choice answers, quantitative data, and so on. In some examples, drafting software may be used to give the hearing professional a structured format for writing clinical interpretation data 308. In some examples, the drafting software may suggest a shorthand to the hearing professional as the hearing professional types or otherwise inputs clinical interpretation data 308. The hearing professional may use various types of devices to provide clinician interpretation data 308, such as computers, tablets, smartphones, hearing instrument programming devices, and so on. In some examples, clinician interpretation data 308 may indicate why the hearing professional chose to make specific adjustments to the settings of the hearing instruments. The user of text and other data in clinician interpretation data 308 may help later hearing professionals understand the motivation and nature of adjustments to the settings of the hearing instruments.

Post-fitting adjustment data 310 may include data describing a plan or performed actions for addressing the subjective complaint of the user. The data describing the plan for addressing the subjective complaint of the user may include indications of post-fitting adjustments to the settings of the hearing instruments.

User profile data 312 may include a user identifier 314, audiological information 316, device information 318, and/or other information 320. User identifier 314 may identify a user of hearing instruments. In some examples, user identifiers of adjustment records matching user identifiers of user profile data may indicate that the same user is associated with the adjustment record and the user profile data. In this way, there may be multiple adjustment records associated with a user for a single set of user profile data associated with the same user. In some examples, user profile data 312 may be generated based on data collected before and during an initial fitting session.

Audiological information 316 of user profile data 312 may include information about the hearing loss of the user. For example, audiological information 316 may include hearing thresholds of the user for various frequency bands.

Device information 318 of user profile data 312 may include information about the hearing devices of the user. The information about the hearing devices of the user may include information identifying the model of the hearing instruments, venting of the hearing instrument, modes of the hearing instruments (e.g., telecoil/induction loop mode, memories for specific situations, such as car, restaurant, crowd, etc.), and so on. In some examples, device information 318 may also include information about accessory devices used by user 104. Example accessory devices may include remote microphones, media streaming devices, and so on. In some examples, device information 318 may include information indicating initial fitting settings or previous settings of the hearing instruments, current settings of the hearing instruments, and/or other information about the settings of the hearing instruments.

Other information 320 included in user profile data 312 may include demographic information regarding the user. Example types of demographic information may include age of the user, health concerns (e.g., dementia, blindness, memory loss, behavioral health concerns, motor control issues, etc.), gender of the user, personality characteristics of the user, and so on. Furthermore, other information 320 may include an experience level of the user with hearing instruments.

In some examples, the other information 320 may include device satisfaction data. The device satisfaction data may include time series data indicating levels of the user's satisfaction with their hearing instruments. Thus, the device satisfaction data may indicate that the user had a satisfaction level of 5 (on a scale of 1-10) on date $X_1$, had a satisfaction level of 8 on date $X_2$, had a satisfaction level of 9 on date $X_3$, and so on. UMS 200 may obtain the device satisfaction data based on responses of the user to a survey. Because the adjustment records 300 may also store date information, UMS 200 may be able to generate information about how the satisfaction level of the user changed after individual post-fitting adjustments to the settings of the user's hearing instruments.

In some examples, the other information 320 may include device use information. The device use information may include time series data indicating amounts of time that the user used their hearing instruments in a time period (e.g., day, week, month, etc.). Because the adjustment records 300 may also store information, UMS 200 may be able to generate information about how the amount of device use changed after individual post-fitting adjustments to the settings of the user's hearing instruments.

In some examples, record generation unit 220 uses device satisfaction data, device use information, or other types of information to evaluate whether a post-fitting adjustment to the settings of hearing instruments 102 was successful. For instance, record generation unit 220 may determine that the post-fitting adjustment was successful if device satisfaction and/or device usage increased after application of the post-fitting adjustment. Based on a determination that the post-fitting adjustment was not successful, record generation unit 220 may determine that user 104 implicitly has a complaint, thereby starting a new process of generating an adjustment record, generating a new post-fitting adjustment suggestion, and so on.

In some examples, UMS 200 may collect real-time, in-situ data about users, hearing instruments, and acoustic environments. The data stored in data storage system 224 may include field use experienced by different users (e.g., average input level, % of time in noise). For instance, data regarding the acoustic environments experienced by a user may be included in the user profile data 312 of the user. UMS 200 may use this information to re-optimize the hearing instrument fitting based on data from successful and unsuccessful users with similar characteristics and hearing instruments in-situ data to the user.

In some examples, UMS 200 may cause adjustment records to be stored in a non-volatile storage device of one or more hearing instruments of the user. In some examples, some or all of user profile data 312 may be stored in a non-volatile storage device of one or more hearing instruments of the user. Conventionally, records of post-fitting adjustments to setting of hearing instruments, if generated at all, are stored on a computing system of a hearing professional that made the post-fitting adjustments to the settings of the hearing instruments. In other words, adjustments to medical devices, such as hearing instruments, are typically recorded in the users' official medical record. However, these medical records follow the patient and not the medical devices; so it can be very difficult to maintain and share detailed records surrounding a specific medical device adjustment event. Of particular interest are the motivations for adjustment, the specific adjustments made, and the subsequent effects of the adjustments (e.g., more device use, better user rating, etc.). It may also be useful to maintain a device-specific record of the repairs, modifications, calibrations, etc. when the hearing instrument is returned to a manufacturer for repairs or service. In some examples, it may also be useful to keep an on-board record of device warranty or service contract (which may be offered as either a service of the professional or the device manufacturer) information. It may also be useful for the one or more of the hearing instruments to automatically store a record of when components like RIC receivers are replaced, which can, e.g., be accomplished by reading the resistive ID of changeable components and detecting when they change. Additionally, in some examples, hearing instruments 102 may store records of when components such as earmolds, wax filters, ear buds, microphone covers, external antennae, or other components are changed. In some examples, when a component change is detected, user 104 or hearing professional 232 may be prompted by UMS 200 or other software with a query as to why the changes was made. Example reasons for component changes may include component failures, routine maintenance, user-reported occlusion effects, user-reported discomfort, and so on.

Storing adjustment records and/or user profile data in non-volatile storage devices of the user's hearing instruments may enable the adjustment records and/or user profile data to be retrieved from the user's hearing instruments to help a hearing professional make further post-fitting adjustments to the settings of the hearing instruments, even if the hearing professional does not have access to computing systems of hearing professionals that made previous post-fitting adjustments to the settings of the hearing instruments.

In this way, the techniques of this disclosure may implement health-record portability in a way that is connected to the hearing instruments.

In some examples, UMS 200 may filter the data stored on the user's hearing instruments to identify, remove, correct, or alert a hearing professional to potentially problematic/sensitive information (e.g., patient name, patient birthdate, patient social security number, etc.) such that the sensitive information is not stored on the medical device.

In some examples, the data may be encrypted to protect the privacy of the information. In some examples, a password may be set to protect the information from unauthorized parties. Encryption keys for the data stored on the user's hearing instruments may be obtained in a variety of ways, e.g., stored in memory of a programming device, stored on a local server, provided through a cloud-based credential verification service, sent from an app/user device where permissions are being granted by the user, and so on. In some examples, the chart notes may need to be decoded from a compressed state such that they may be more easily read by the provider.

In some examples, UMS 200 may cause the adjustment record to be stored in a non-volatile storage system of a server system remote from the hearing instruments of the specific user. In such examples, UMS 200 may cause a resource identifier, such as a link or pointer, of the adjustment record to be stored on a non-volatile storage system of the hearing instrument of the specific user. The resource identifier may identify an individual adjustment record, identify the specific user, or otherwise enable retrieval of data of an adjustment record. In some examples, the adjustment records stored by the server system may be accessible to authorized hearing professionals belonging to different organizations or groups of hearing professionals. In this way, storing the resource identifier in the non-volatile storage device of the hearing instrument may enable various authorized hearing professionals to improve the settings of the hearing instruments even if the hearing professionals are not part of the same organization or group of hearing professionals. In examples embodiments, authorization may to come from more than one party, such as user 104 and an authorized hearing professional. Storing the adjustment records and/or user profile data in the storage system of a server system may also have an advantage of allowing the adjustment records and/or user profile data to be more readily available for use in training one or more ML models, such as initial fitting model 202, post-fitting adjustment model 204, and fitting support model 206. At the same time, storing the adjustment records and/or user profile data in the storage system of a server system may reduce the memory storage requirements of the hearing instruments and/or may reduce health-privacy concerns. In this way, the techniques of this disclosure may enable health-record portability.

In some examples, UMS 200 may compress, encode, convert to shorthand, or otherwise perform actions to reduce the memory allocations needed to store data such as adjustment records, user profile data, etc. In some examples, drafting software may be utilized to give hearing professional 232 a structured format for writing notes, such as chart notes, progress nodes, subjective-objective-assessment-plan (SOAP) notes, and the like. In some examples, hearing professional 232 may be given selectable options for compiling notes. In some examples, suggested shorthand may be suggested to hearing professional 232 as hearing professional 232 types or otherwise enters data.

In some examples, UMS 200 may enable additional data to be added to an existing adjustment record. For example, UMS 200 may store use data following a post-fitting adjustment as an addendum to an existing adjustment record. Similarly, UMS 200 may ask user 104 questions and store the responses of user 104 to the questions following a post-fitting adjustment as an addendum to an existing adjustment record. An example question may be, "How would you rate your devices since the adjustments were made?" In some examples, a hearing professional may add information to an existing adjustment record to document the outcomes of a previous adjustment wherein the provider may manually contribute patient feedback or outcomes data.

In some examples, user biometric-authentication data may be needed to confirm that hearing instruments 102 were being used by the intended person. Various methods known in the art may be utilized to confirm that hearing instruments 102 are in the intended user/owner of hearing instruments 102.

In some examples, UMS 200 may send an authorization prompt to the user in response to a third-party request for access to data (e.g., adjustment records, user profile data, etc.). The user may respond to these prompts in a variety of ways. In some examples, the user may respond to a push notification on their smartphone. In some examples, the user may make a gesture, a voice response, or engage a user control. In some examples, biometric data (e.g., voice fingerprint, biosensor inputs, etc.) regarding the user may be utilized to confirm that it is the intended user providing authorization, thereby preventing unauthorized access to the records and detrimental loss of privacy.

Figure 4:
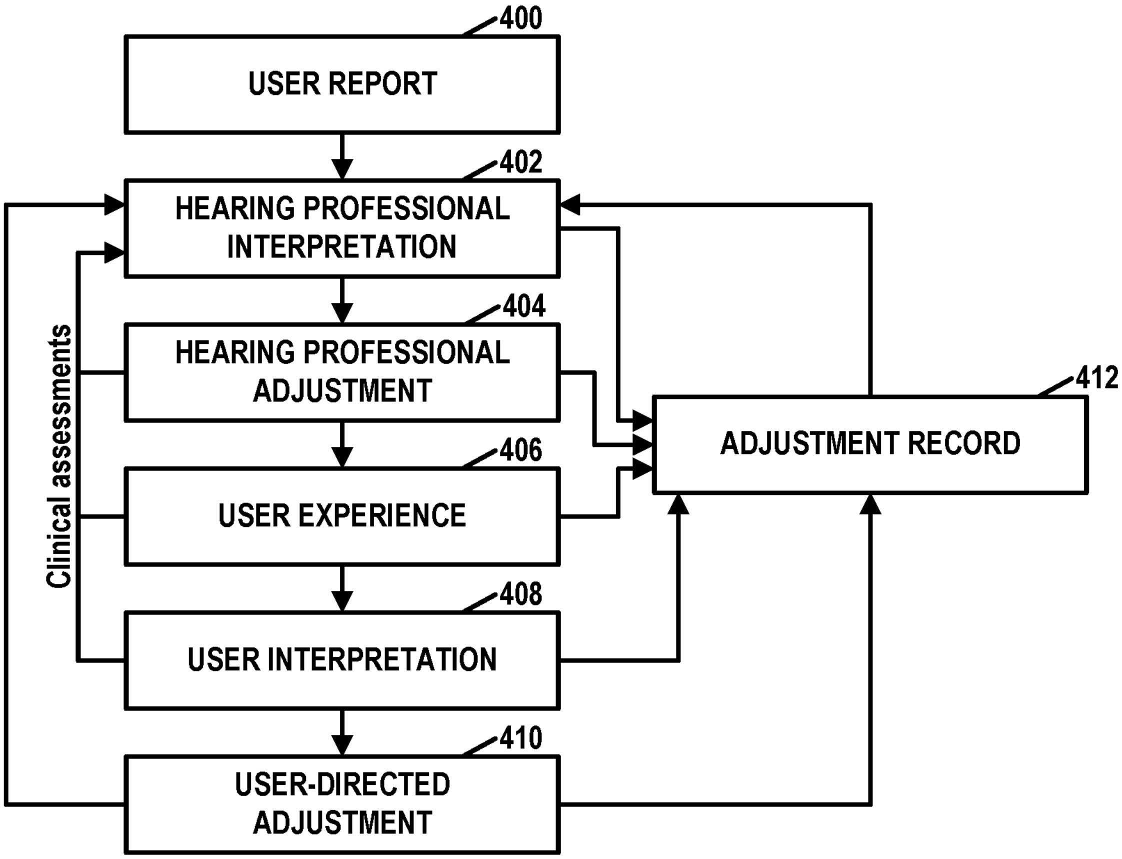
FIG. 4 is a flow diagram illustrating an example process for adjustment record generation, in accordance with one or more aspects of this disclosure.

FIG. 4 is a flow diagram illustrating an example process for adjustment record generation, in accordance with one or more aspects of this disclosure. In the example of FIG. 4, record generation unit 220 may receive a user report describing a complaint (400). Additionally, post-fitting adjustment unit 214 may receive data indicating a hearing professional interpretation of the complaint (402). Post-fitting adjustment unit 214 may also receive data indicating a post-fitting adjustment selected by hearing professional 232 (404).

Furthermore, post-fitting adjustment unit 214 may obtain indications of user experience with respect to the post-fitting adjustment (406). For instance, the indication of user experience with respect to the post-fitting adjustment may include comments from the user to hearing professional or other data regarding the environment in which the user is having hearing difficulties. The usage data and data regarding the environment in which the user is having hearing difficulties may be included in the adjustment record. Post-fitting adjustment unit 214 may also obtain indications of the user interpretation of the post-fitting adjustment (408). The user interpretation of the post-fitting adjustment may include data regarding the subjective feeling of the user with respect to the post-fitting adjustment. For instance, the user interpretation of the post-fitting adjustment may include data indicating whether the user is satisfied with the sound quality of the hearing instruments following the post-fitting adjustment. Post-fitting adjustment unit 214 may include the indications of user experience and indications of user interpretation in a post-fitting adjustment record. Hearing professional 232 may use the indications of user experience and indications of user interpretation when preparing an interpretation of the complaint. As shown in the example of FIG. 4, hearing professional adjustments, indications of user experience, indications of user interpretation can be used as clinical assessments that may help the hearing professional form an interpretation of the complaint.

In some examples, user 104 may make their own post-fitting adjustments (i.e., user-directed adjustments) to one or more settings of hearing instruments 102 (410). For instance, user 104 may use a companion application to make changes to one or more settings of hearing instruments 102. Record generation unit 220 may generate an adjustment record when user 104 makes a post-fitting adjustment to one or more settings of hearing instruments 102. In some examples, record generation unit 220 or another system may query user 104 for information explaining the reasons for user 104 making adjustments to the settings of hearing instruments 102 or other configurations of hearing instruments 102. Hearing professional 232 may review such adjustments records when interpreting complaints of user 104. One or more of hearing professional interpretation (402), hearing professional adjustment (404), user experience (406), user interpretation (408), or user-directed adjustments (410) may be included in an adjustment record 412.

Figure 5:
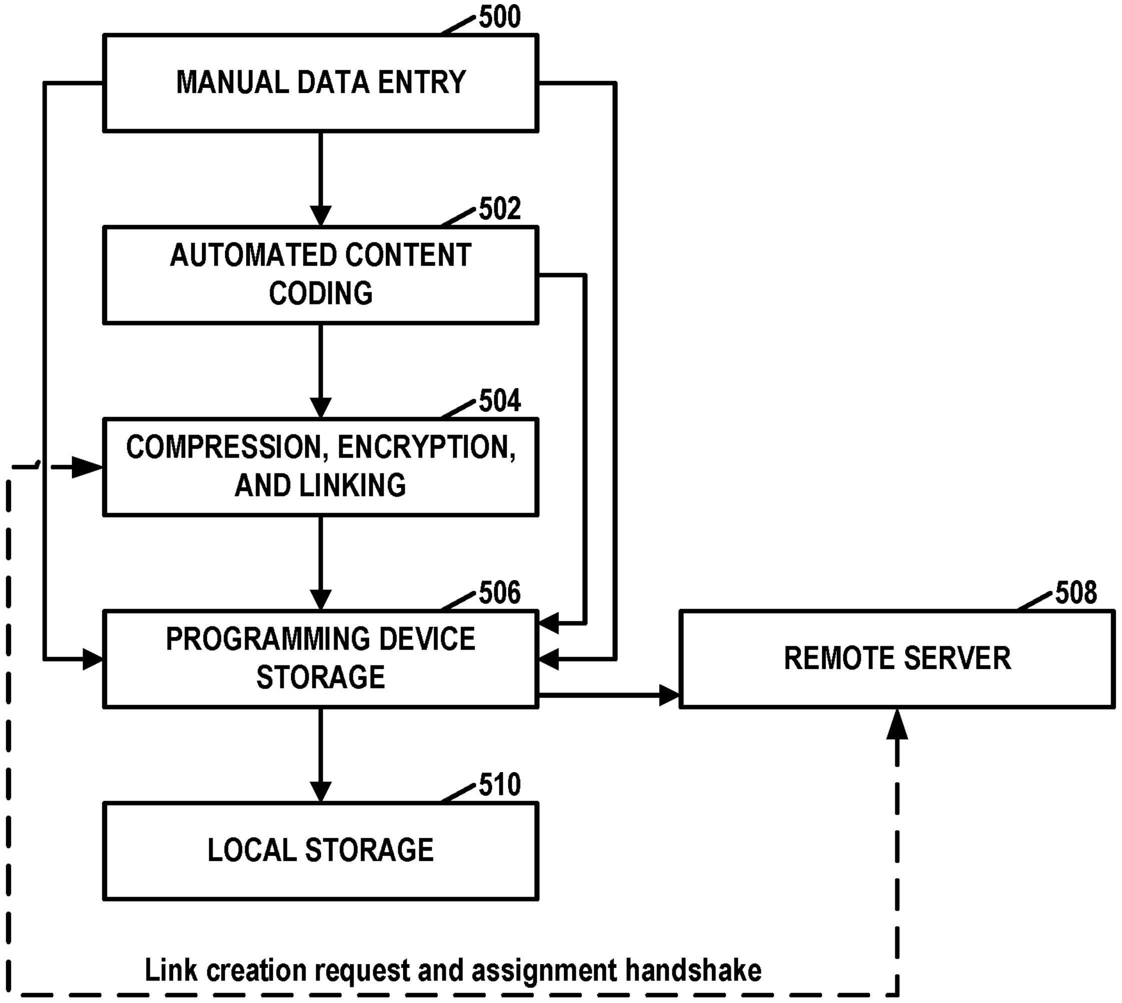
FIG. 5 is a conceptual diagram illustrating an example process for local storage of adjustment records, in accordance with one or more aspects of this disclosure.

FIG. 5 is a conceptual diagram illustrating an example process for local storage of adjustment records, in accordance with one or more aspects of this disclosure. In the example of FIG. 5, a programming device may receive manual data entry from user 104 or hearing professional 232 (500). The programming device is a device configured to change the settings of hearing instruments 102 or otherwise configure hearing instruments 102. In some examples, the programming device is a smartphone, tablet, accessory device, special purpose device, or other type of device used by user 104 or hearing professional 232. Furthermore, the programming device may perform automated content coding (502). Automated content coding may include automatically labeling an event being stored in the adjustment record. In some examples, automated coding may be based on actions of user 104 (i.e., the adjuster of hearing instruments 102), e.g., an adjustment to increase hearing instrument gain at certain frequency ranges may be encoded as an event where settings of hearing instruments 102 were adjusted to increase speech clarity, meanwhile adjustments at other frequencies may be automatically interpreted as an adjustment to increase perceptual loudness. In some examples, user 104 inputs a response to a query (e.g., a question provided by fitting software), user 104 activates a user control, user 104 makes an adjustment to settings of hearing instruments 102 using an accessory device such as a companion application on a connected smartphone, etc. In some other examples, content analysis or keyword detection may be used to automatically label the event being stored. For example, the clinician's notes may indicate what adjustments were performed and the system can assign codes based on the content contained in those notes.

The programming device may also perform compression, encryption, and linking of adjustment records (504). In other words, the programming device may perform compression and/or encryption on the manually entered data and/or automatically coded content. Additionally, linking of adjustment records may include the generation of one or more links that identifies records (e.g., adjustment records) stored in a storage system of a remote server 508, such as computing system 106. In some examples where full adjustment records are stored in a centralized server, the programming device may link an adjustment record by storing a link to the adjustment record in one or more of hearing instruments 102 or the programming device. In some examples, the programming device may interact with remote server 508 to generate the link data and to perform an assignment handshake that authenticates the programming device and remote server 508 with each other. Authentication may be required to use the link.

A storage system of the programming device may, at least temporarily, store the compressed and encrypted data, and the link data (506). Additionally, the programming device may send the compressed and encrypted data for storage in the storage system of remote server 508. The programming device may send the link data for local storage in a storage system of one or more of hearing instruments 102 (510).

Figure 6:
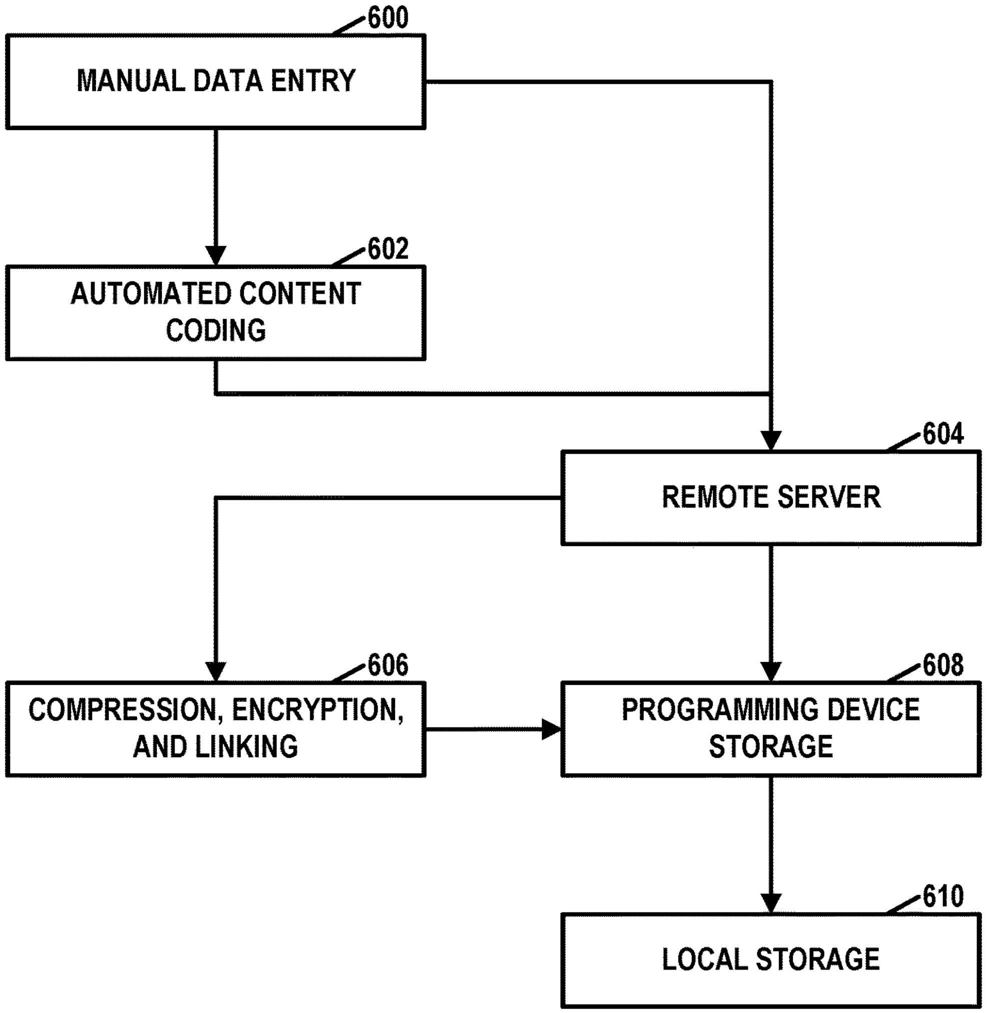
FIG. 6 is a conceptual diagram illustrating an example process for remote storage of adjustment records, in accordance with one or more aspects of this disclosure.

FIG. 6 is a conceptual diagram illustrating an example process for remote storage of adjustment records, in accordance with one or more aspects of this disclosure. In the example of FIG. 6, a programming device may receive manual data entry from user 104 or hearing professional 232 (600). Additionally, the programming device may perform automated content coding (602). The programming device may provide the manually entered data and automatically coded content to a remote server, such as computing system 106 (604). The remote server may perform compression, encryption, and linking on the received data (606). The remote server may provide the link data for storage in a data storage system of the programming device (608). The programming device may then provide the link data for storage in the local storage of one or more of hearing instruments 102 (610).

Figure 7:
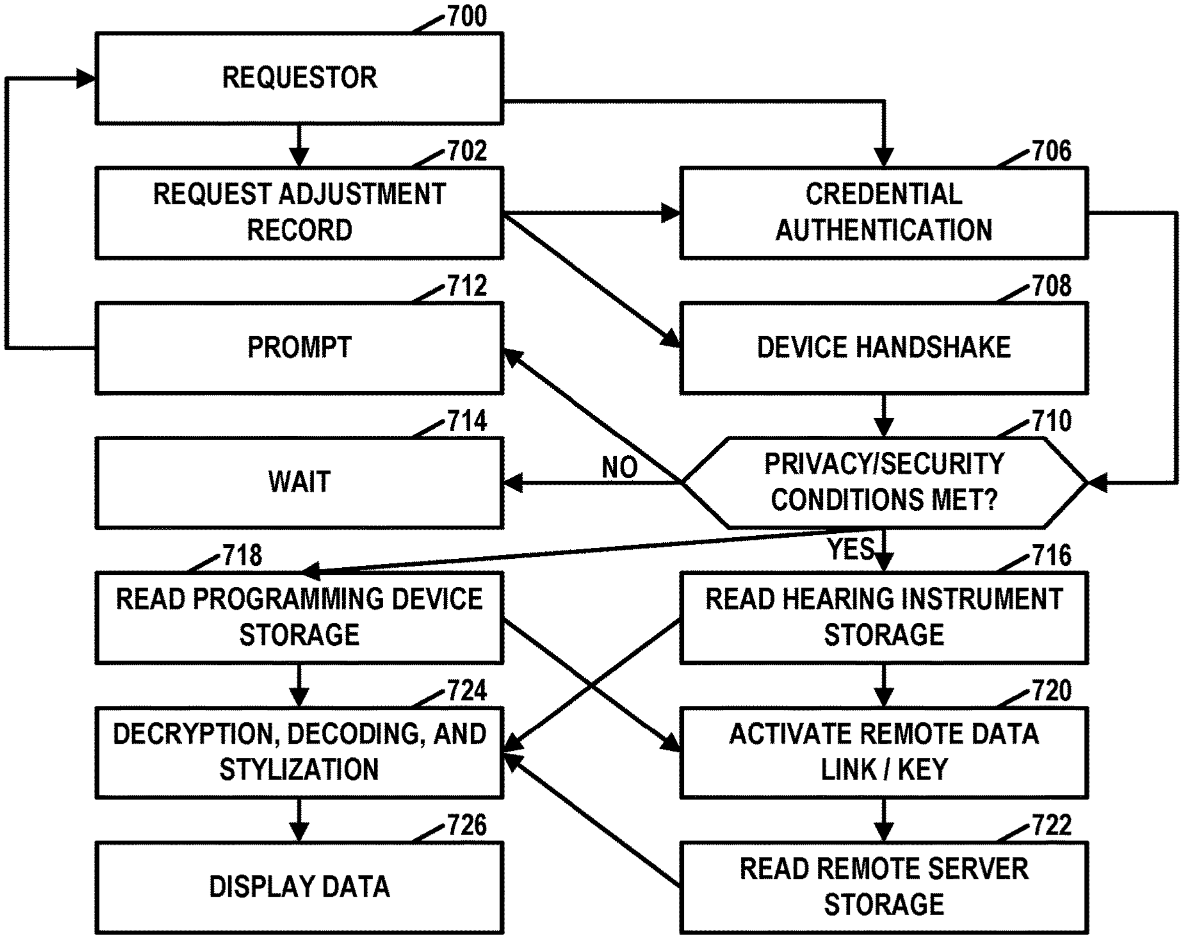
FIG. 7 is a conceptual diagram illustrating an example process for recall of adjustment records, in accordance with one or more aspects of this disclosure.

FIG. 7 is a conceptual diagram illustrating an example process for recall of adjustment records, in accordance with one or more aspects of this disclosure. In the example of FIG. 7, a requestor 700, such as user 104 or hearing professional 232, may use a local device, such as a programming device, to generate a request for an adjustment record (702). Additionally, the requestor 700 may provide a credential for authentication (706) and the programming device may perform a device handshake with the remote server (708). If privacy and security conditions are not met ("NO" branch of 710), the remote server may cause the local device to generate a prompt to provide correct authentication credentials (712). The remote server may wait for the new authentication credentials (714).

If the privacy and security conditions have been met ("YES" branch of 710), the remote server may grant the local device the ability to read data from a storage system of hearing instruments 102 (716). Additionally, the remote server may grant the local device the ability to read data from a storage system of a programming device (718). The local device may obtain link data from the storage system of hearing instruments 102 and/or the programming device (720). The local device may then use the link data to read data, such as one or more adjustment records, from a data storage system of the remote server (722). The local device, or other device, may then perform a decryption, decoding, and stylization process to prepare the data for presentation (724). The local device may then display the data (726).

FIG. 8 is a block diagram illustrating example components of hearing instrument 102A, in accordance with one or more aspects of this disclosure. Hearing instrument 102B may include the same or similar components of hearing instrument 102A shown in the example of FIG. 8. In the example of FIG. 8, hearing instrument 102A comprises one or more storage devices 802, one or more communication unit(s) 804, a receiver 806, one or more processors 112A, one or more microphone(s) 810, sensors 118A, a power source 814, and one or more communication channels 816. Communication channels 816 provide communication between storage devices 802, communication unit(s) 804, receiver 806, processor(s) 808, microphone(s) 810, and sensors 118A. Storage devices 802, communication unit(s)

804, receiver 806, processors 112A, microphone(s) 810, and sensors 118A may draw electrical power from power source 814.

In the example of FIG. 8, each of storage devices 802, communication unit(s) 804, receiver 806, processors 112A, microphone(s) 810, sensors 118A, power source 814, and communication channels 816 are contained within a single housing 818. Thus, in such examples, each of storage devices 802, communication unit(s) 804, receiver 806, processors 112A, microphone(s) 810, sensors 118A, power source 814, and communication channels 816 may be within in-ear assembly of hearing instrument 102A. However, in other examples of this disclosure, storage devices 802, communication unit(s) 804, receiver 806, processors 112A, microphone(s) 810, sensors 118A, power source 814, and communication channels 816 may be distributed among two or more housings. For instance, in an example where hearing instrument 102A is a RIC device, receiver 806, one or more of microphone(s) 810, and one or more of sensors 118A may be included in an in-ear housing separate from a behind-the-ear housing that contains the remaining components of hearing instrument 102A. In such examples, a RIC cable may connect the two housings.

In the example of FIG. 8, sensors 118A include an inertial measurement unit (IMU) 826 that is configured to generate data regarding the motion of hearing instrument 102A. IMU 826 may include a set of sensors. For instance, in the example of FIG. 8, IMU 826 includes one or more accelerometers 828, a gyroscope 830, a magnetometer 832, combinations thereof, and/or other sensors for determining the motion of hearing instrument 102A. Furthermore, in the example of FIG. 8, hearing instrument 102A may include additional sensors 844, such as a temperature sensor, an electroencephalography (EEG) sensor, an electrocardiograph (ECG) sensor, a photoplethysmography (PPG) sensor, a capacitance sensor, blood oximetry sensors, blood pressure sensors, environmental pressure sensors, environmental humidity sensors, skin galvanic response sensors, image sensors, light sensors, magnetic sensors and/or other types of sensors. Examples of magnetic sensors may include GMR, TMR, telecoils, and so on. Data from one or more of sensors 118 may be utilized for activity and environment classifications that may help the characterize one or more the user experience or outcomes of an adjustment. For instance, record generation unit 220 may use data from sensors 118 to detect changes in activity or sociability patterns of user 104 associated with use of hearing instruments 102, e.g., as described in U.S. Patent Publication 20200245938A1. In other examples, hearing instrument 102A and sensors 118A may include more, fewer, or different components.

Storage device(s) 802 may store data. Storage device(s) 802 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 802 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Communication unit(s) 804 may enable hearing instrument 102A to send data to and receive data from one or more other devices, such as a device of computing system 106 (FIG. 1), another hearing instrument (e.g., hearing instrument 102B), an accessory device, a mobile device, or another type of device. Communication unit(s) 804 may enable hearing instrument 102A to use wireless or non-wireless communication technologies. For instance, communication unit(s) 804 enable hearing instrument 102A to communicate using one or more of various types of wireless technology, such as a BLUETOOTH™ technology, 3G, 4G, 4G LTE, 5G, 6G, ZigBee, WI-FI™, Near-Field Magnetic Induction (NFMI), ultrasonic communication, infrared (IR) communication, or another wireless communication technology. In some examples, communication unit(s) 804 may enable hearing instrument 102A to communicate using a cable-based technology, such as a Universal Serial Bus (USB) technology.

Receiver 806 comprises one or more speakers for generating audible sound. Microphone(s) 810 detect incoming sound and generate one or more electrical signals (e.g., an analog or digital electrical signal) representing the incoming sound.

Processor(s) 808 may be processing circuits configured to perform various activities. For example, processor(s) 808 may process signals generated by microphone(s) 810 to enhance, amplify, or cancel-out particular channels within the incoming sound. Processor(s) 808 may then cause receiver 806 to generate sound based on the processed signals. In some examples, processor(s) 808 include one or more digital signal processors (DSPs). In some examples, processor(s) 808 may cause communication unit(s) 804 to transmit one or more of various types of data. For example, processor(s) 808 may cause communication unit(s) 804 to transmit data to computing system 106. Furthermore, communication unit(s) 804 may receive audio data from computing system 106 and processor(s) 808 may cause receiver 806 to output sound based on the audio data.

In the example of FIG. 8, receiver 806 includes speaker 108A. Speaker 108A may generate a sound that includes a range of frequencies. Speaker 108A may be a single speaker or one of a plurality of speakers in receiver 806. For instance, receiver 806 may also include "woofers" or "tweeters" that provide additional frequency range. In some examples, speaker 108A may be implemented as a plurality of speakers. In some examples, hearing instrument 102A may include mechanical/automated venting controls that regulate the amount of sound leakage or ambient noise passing through the hearing device. Vent status may be an additional hearing instrument setting that may be modified and/or stored in the fitting or adjustment process.

Furthermore, in the example of FIG. 8, microphone(s) 810 include a microphone 110A. Microphone 110A may measure an acoustic response to the sound generated by speaker 108A. In some examples, microphone(s) 810 include multiple microphones. Thus, microphone 110A may be a first microphone and microphone(s) 810 may also include a second, third, etc. microphone. In some examples, microphone(s) 810 include microphones configured to measure sound in an auditory environment of user 104. In some examples, one or more of microphone(s) 810 in addition to microphone 110A may measure the acoustic response to the sound generated by speaker 108A.

In the example of FIG. 8, storage device(s) 802 may store one or more adjustment records 846. In some examples, storage device(s) 802 may store one or more resource identifiers 848. Resource identifiers 848 may identify adjustment records 846 stored on a storage system of a remote computing system, such as computing system 106. Furthermore, in the example of FIG. 8, storage device(s) 802 may store settings 850. Settings 850 may control how hearing instrument 102A operates. For instance, settings 850 may control how hearing instrument 102A processes sound for output by receiver 806.

FIG. 9 is a block diagram illustrating example components of a computing device 900, in accordance with one or more aspects of this disclosure. FIG. 9 illustrates only one particular example of computing device 900, and many other example configurations of computing device 900 exist. Computing device 900 may be a computing device in computing system 106 (FIG. 1). For instance, computing device 900 may be a cloud-based server device that is remote from hearing instruments 102. In some examples, computing device 900 is a programming device, such as a smartphone, tablet computer, personal computer, accessory device, or other type of device.

As shown in the example of FIG. 9, computing device 900 includes one or more processors 902, one or more communication units 904, one or more input devices 908, one or more output devices 910, a display screen 912, a power source 914, one or more storage devices 916, and one or more communication channels 918. Computing device 900 may include other components. For example, computing device 900 may include physical buttons, microphones, speakers, communication ports, and so on. Communication channel(s) 918 may interconnect each of components 902, 904, 908, 910, 912, and 916 for inter-component communications (physically, communicatively, and/or operatively). In some examples, communication channel(s) 918 may include a system bus, a network connection, an inter-process communication data structure, or any other method for communicating data. Power source 914 may provide electrical energy to components 902, 904, 908, 910, 912 and 916.

Storage device(s) 916 may store information required for use during operation of computing device 900. In some examples, storage device(s) 916 have the primary purpose of being a short-term and not a long-term computer-readable storage medium. Storage device(s) 916 may be volatile memory and may therefore not retain stored contents if powered off. Storage device(s) 916 may be configured for long-term storage of information as non-volatile memory space and retain information after power on/off cycles. In some examples, processor(s) 902 on computing device 900 read and may execute instructions stored by storage device(s) 916.

Computing device 900 may include one or more input devices 908 that computing device 900 uses to receive user input. Examples of user input include tactile, audio, and video user input. Input device(s) 908 may include presence-sensitive screens, touch-sensitive screens, mice, keyboards, voice responsive systems, microphones or other types of devices for detecting input from a human or machine.

Communication unit(s) 904 may enable computing device 900 to send data to and receive data from one or more other computing devices (e.g., via a communications network, such as a local area network or the Internet). For instance, communication unit(s) 904 may be configured to receive data sent by hearing instrument(s) 102, receive data generated by user 104 of hearing instrument(s) 102, receive and send request data, receive and send messages, and so on. In some examples, communication unit(s) 904 may include wireless transmitters and receivers that enable computing device 900 to communicate wirelessly with the other computing devices. For instance, in the example of FIG. 9, communication unit(s) 904 include a radio 906 that enables computing device 900 to communicate wirelessly with other computing devices, such as hearing instruments 102 (FIG. 1). Examples of communication unit(s) 904 may include network interface cards, Ethernet cards, optical transceivers, radio frequency transceivers, or other types of devices that are able to send and receive information. Other examples of such communication units may include BLUETOOTH™, 3G, 4G, 5G, 6G, and WI-FI™ radios, Universal Serial Bus (USB) interfaces, etc. Computing device 900 may use communication unit(s) 904 to communicate with one or more hearing instruments (e.g., hearing instruments 102 (FIG. 1, FIG. 8)). Additionally, computing device 900 may use communication unit(s) 904 to communicate with one or more other remote devices.

Output device(s) 910 may generate output. Examples of output include tactile, audio, and video output. Output device(s) 910 may include presence-sensitive screens, sound cards, video graphics adapter cards, speakers, liquid crystal displays (LCD), or other types of devices for generating output. Output device(s) 910 may include display screen 912.

Processor(s) 902 may read instructions from storage device(s) 916 and may execute instructions stored by storage device(s) 916. Execution of the instructions by processor(s) 902 may configure or cause computing device 900 to provide at least some of the functionality ascribed in this disclosure to computing device 900. As shown in the example of FIG. 9, storage device(s) 916 include computer-readable instructions associated with operating system 920. In some examples, storage device(s) 916 include computer-readable instructions associated with UMS 200. In some examples, such as examples where computing device 900 is a programming device used by user 104 or hearing professional 232, storage device(s) 916 store computer-readable instructions associated with a companion application 924.

Execution of instructions associated with operating system 920 may cause computing device 900 to perform various functions to manage hardware resources of computing device 900 and to provide various common services for other computer programs. Execution of instructions associated with UMS 200 may cause computing device 900 to provide the functionality of UMS 200. Execution of instructions associated with companion application 924 by processor(s) 902 may cause computing device 900 to perform one or more of various functions.

For example, execution of instructions associated with companion application 924 may cause computing device 900 to configure communication unit(s) 904 to send and receive data from hearing instruments 102, such as data to adjust the settings of hearing instruments 102. Companion application 924 may also provide user interfaces for user 104, hearing professional 232, or other users to provide information to UMS 200. For example, companion application 924 may provide a user interface to enable user 104 to input subjective complaint data, enable hearing professional 232 to input clinician interpretation data, enable hearing professional 232 or user 104 to change settings of hearing instruments 102, and so on. In some examples, companion application 924 is an instance of a web application or server application. In some examples, such as examples where computing device 900 is a mobile device or other type of computing device, companion application 924 may be a native application.

In some examples, storage device(s) 916 may also store adjustment records 238, user profile data 228, RFC records 240, and/or other types of data.

Figure 10:
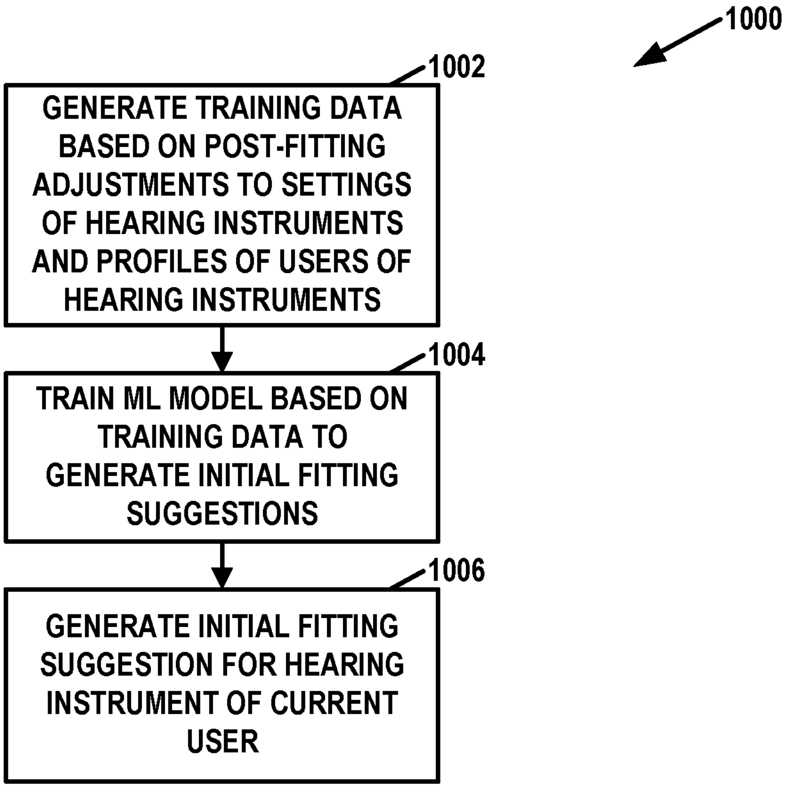
FIG. 10 is a flowchart illustrating an example fitting operation in accordance with one or more aspects of this disclosure.

FIG. 10 is a flowchart illustrating an example fitting operation 1000, in accordance with one or more aspects of this disclosure. The flowcharts of this disclosure are provided as examples. Other examples of this disclosure may include more, fewer, or different actions. Although this disclosure describes FIG. 10 and the other flowcharts of this disclosure with reference to the preceding figures, the techniques of this disclosure are not so limited. For instance, this disclosure describes actions as being performed by units described in FIG. 2, but such actions may be performed by one or more processors of processing system 114 (FIG. 1).

In the example of FIG. 10, initial fitting training unit 208 generates training data (e.g., initial fitting training data 239) based on post-fitting adjustments made to settings of a plurality of hearing instruments and based on profiles of users of the plurality of hearing instruments (1002). Thus, the training data may be crowdsourced from a plurality of users. The post-fitting adjustments are made to the settings of the plurality of hearing instruments after initial uses of the plurality of hearing instruments. An initial use of a hearing instrument may occur when a user uses the hearing instrument for the first time. As described elsewhere in this disclosure, the training data may include training data pairs. The input dataset of a training data pair may be based on user profile data 228 for an individual user. The target dataset of the training data pair may be based on post-fitting adjustment data in an adjustment record of the individual user.

Furthermore, in the example of FIG. 10, initial fitting training unit 208 trains a ML model (e.g., initial fitting model 202) based on the training data to generate initial fitting suggestions (1004). For example, initial fitting model 202 may be implemented as an artificial neural network. In this example, initial fitting training unit 208 may perform a forward pass through the artificial neural network, using the input dataset of a training data pair as input to the artificial neural network. Initial fitting training unit 208 may use an error function to compare output of the artificial neural network to the target dataset of the training data pair. Initial fitting training unit 208 may perform a backpropagation process based on one or more error values produced by the error function to adjust parameters of the artificial neural network. In other examples, the ML model may be implemented in other ways and processing system 114 may use a different process to train the ML model.

Prior to an initial use of a current hearing instrument (e.g., one of hearing instruments 102) by user 104, initial fitting unit 210 may generate an initial fitting suggestion for the hearing instrument of user 104 by applying the ML model to input that includes a profile of user 104 (1006). For instance, in an example where the ML model is an artificial neural network, initial fitting unit 210 may generate an input dataset based on user profile data 228 of user 104. In this example, initial fitting unit 210 may then perform a forward pass through the artificial neural network, using the input dataset as input to the artificial neural network. In this example, the output of the artificial neural network may include the initial fitting suggestion for the hearing instrument of user 104.

The hearing instrument of user 104 may be configured based on the initial fitting suggestion. For instance, in an example where computing system 106 implements initial fitting unit 210, computing system 106 may transfer the initial fitting suggestion to a programming device, such as a smartphone, tablet, or accessory device of user 104. The programming device may then communicate, e.g., via a wireless or non-wireless communication link, with the hearing instrument to adjust the settings of the hearing instrument based on the initial fitting suggestion. This process may be performed automatically. In some examples, user 104 or hearing professional 232 may manually configure the hearing instrument of user 104 based on the initial fitting suggestion, e.g., by setting individual settings of the hearing instrument using a programming device.

Figure 11:
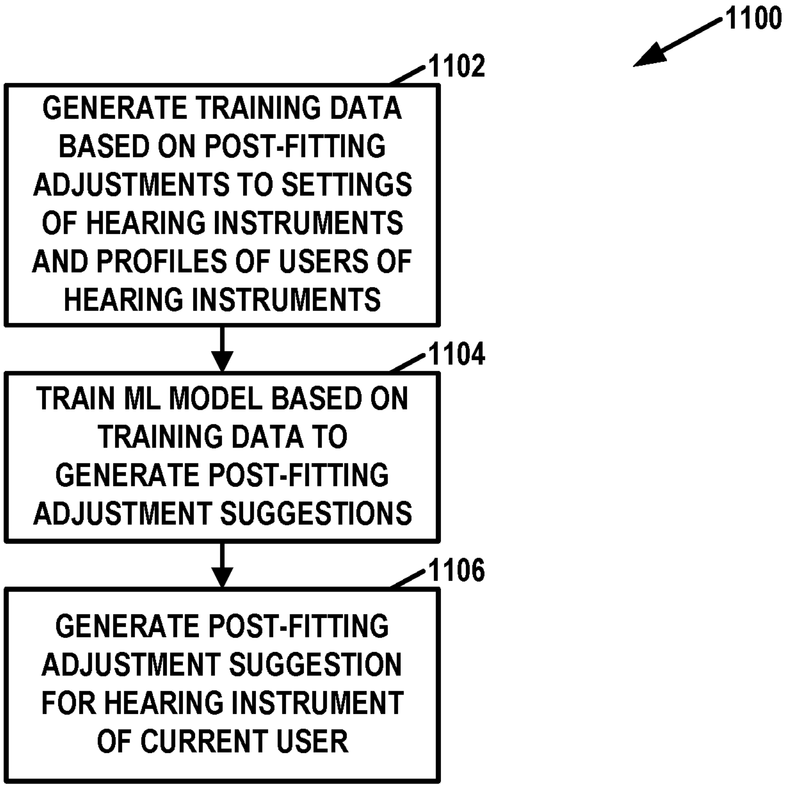
FIG. 11 is a flowchart illustrating an example post-fitting adjustment operation, in accordance with one or more aspects of this disclosure.

FIG. 11 is a flowchart illustrating an example post-fitting adjustment operation 1100, in accordance with one or more aspects of this disclosure. In the example of FIG. 11, post-fitting training unit 212 generates training data (e.g., post-fitting training data 242) based on post-fitting adjustments made to settings of a plurality of hearing instruments and based on profiles of users of the plurality of hearing instruments (1102). For instance, post-fitting training unit 212 may generate the training data based on adjustment records 238 and user profile data 228. The post-fitting adjustments are made to the settings of the plurality of hearing instruments after initial uses of the plurality of hearing instruments. For instance, as described elsewhere in this disclosure, the training data may include training data pairs. The input dataset of a training data pair may be based on user profile data 228 for an individual user. The target dataset of the training data pair may be based on post-fitting adjustment data in an adjustment record of the individual user.

Furthermore, post-fitting training unit 212 trains a ML model (e.g., post-fitting adjustment model 204) based on the training data to generate post-fitting adjustment suggestions 230 (1104). For example, post-fitting adjustment model 204 may be implemented as an artificial neural network. In this example, post-fitting training unit 212 may perform a forward pass through the artificial neural network, using the input dataset of a training data pair as input to the artificial neural network. Post-fitting training unit 212 may use an error function to compare output of the artificial neural network to the target dataset of the training data pair. Post-fitting training unit 212 may perform a backpropagation process based on one or more error values produced by the error function to adjust parameters of the artificial neural network. In other examples, the ML model may be implemented in other ways and processing system 114 may use a different process to train the ML model. Thus, post-fitting training unit 212 may generate training data based on the post-fitting adjustments made to the settings of the plurality of hearing instruments and based on the profiles of the users of the plurality of hearing instruments, and may train the ML model based on the training data to determine post-fitting adjustment suggestions.

After an initial use of a current hearing instrument (e.g., one of hearing instruments 102) by user 104, post-fitting adjustment unit 214 may generate a post-fitting adjustment suggestion for the hearing instrument of user 104 by applying the ML model to input that includes a profile of user 104 (1106). For instance, in an example where the ML model is an artificial neural network, post-fitting adjustment unit 214 may generate an input dataset based on user profile data 228 of user 104. In this example, post-fitting adjustment unit 214 may then perform a forward pass through the artificial neural network, using the input dataset as input to the artificial neural network. In this example, the output of the artificial neural network may include the post-fitting adjustment suggestion for the hearing instrument of user 104. Thus, after the initial use of a hearing instrument by user 104, post-fitting adjustment unit 214 may generate a post-fitting adjustment suggestion for the hearing instrument by applying the ML model to input that includes the profile of user 104.

Figure 12:
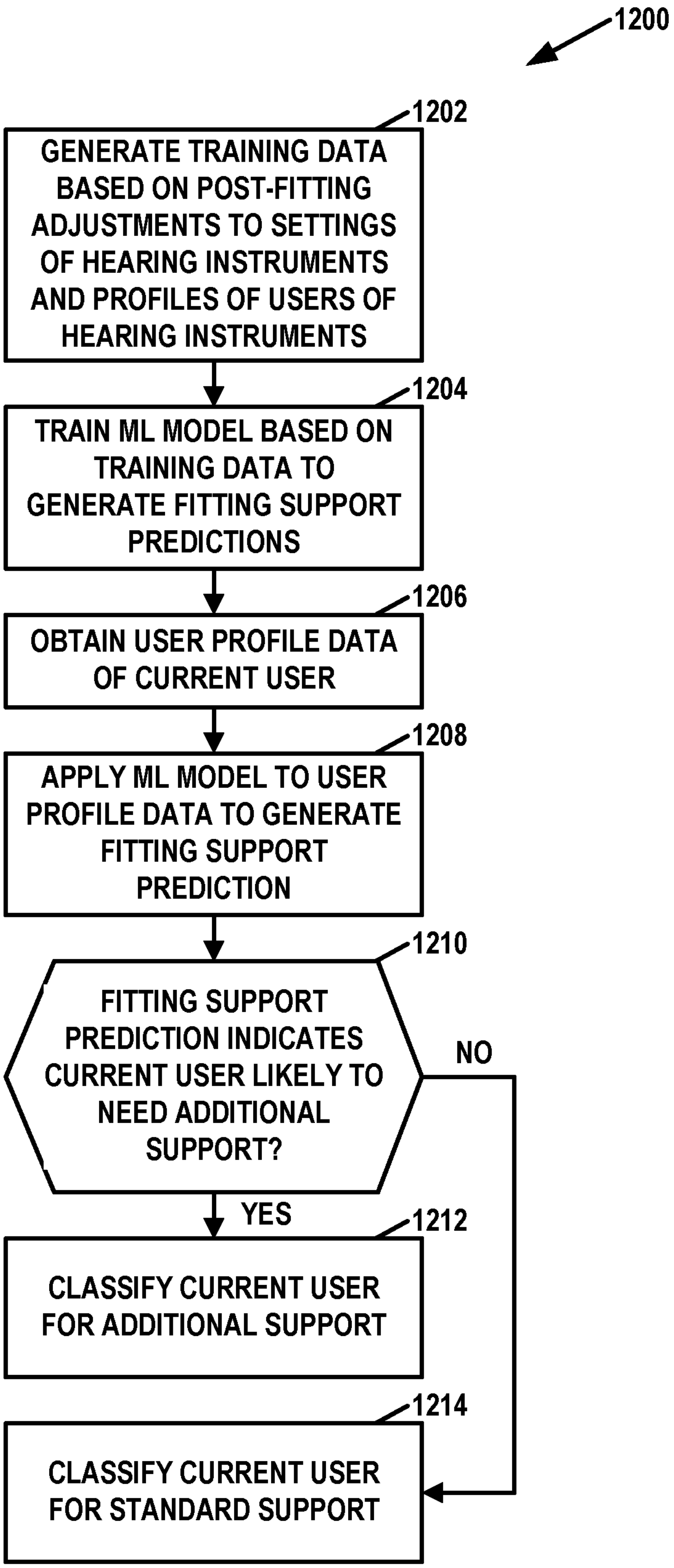
FIG. 12 is a flowchart illustrating an example operation for determining whether a user is likely to need additional support, in accordance with one or more aspects of this disclosure.

FIG. 12 is a flowchart illustrating an example operation 1200 for determining whether user 104 is likely to need additional support, in accordance with one or more aspects of this disclosure. In the example of FIG. 12, fitting support training unit 216 may generate fitting support training data 244 based on post-fitting adjustments to settings of hearing instruments and profiles of users of the hearing instruments (1202). As described elsewhere in this disclosure, fitting support training unit 216 may generate fitting support training data 244 based on adjustment records 238, user profile data 228, and/or RFC records 240.

Fitting support training unit 216 may train a ML model (e.g., fitting support model 206) based on the training data to generate fitting support predictions for users of hearing instruments (1204). A fitting support prediction for a user may indicate whether the user is likely to need additional support to achieve satisfactory settings in their hearing instruments. For example, fitting support model 206 may be implemented as an artificial neural network. In this example, fitting support training unit 216 may perform a forward pass through the artificial neural network, using the input dataset of a training data pair as input to the artificial neural network. Fitting support training unit 216 may use an error function to compare output of the artificial neural network to the target dataset of the training data pair. Fitting support training unit 216 may perform a backpropagation process based on one or more error values produced by the error function to adjust parameters of the artificial neural network. In other examples, the ML model may be implemented in other ways and fitting support training unit 216 may use a different process to train the ML model.

Thus, in some examples, fitting support training unit 216 may train the ML model based on the post-fitting adjustments and the profiles of the users to determine user support levels (e.g., standard support, additional support, etc.) that indicate levels of user support associated with the users of the plurality of hearing instruments. Reuse of the adjustment record 238 describing the post-fitting adjustment for training the fitting support model 206, initial fitting model 202, and/or post-fitting adjustment model 204 may reduce the overall amount of data that needs to be available to train these models, which may lead to efficiencies in data storage and may increase performance of these models by having a broader pool of data from which to generate training data.

Furthermore, in the example of FIG. 12, support prediction unit 218 may obtain user profile data of a current user (e.g., user 104) (1206). Support prediction unit 218 may obtain the user profile data of the current user from data storage system 224. Additionally, support prediction unit 218 may apply the ML model (e.g., fitting support model 206) to the user profile data of the current user to generate a fitting support prediction for the current user (1208). The fitting support prediction for the current user may indicate whether the current user is likely to need additional support. In examples where the ML model is implemented as an artificial neural network, support prediction unit 218 may perform a forward pass through the artificial neural network, using input data based on the user profile data for the current user. Output of the artificial neural network may include the fitting support prediction for the current user.

Support prediction unit 218 may determine whether the fitting support prediction for the current user indicates that the current user is likely to need additional support (1210). Based on a determination that the current user is likely to need additional support ("YES" branch of 1210), support prediction unit 218 may classify the current user for additional support (1212). For example, support prediction unit 218 may generate output to the current user, a hearing professional, or other person to indicate that the current user may need additional support in order to achieve settings that have satisfactory results for the current user. On the other hand, based on a determination that the current is not likely to need additional support ("NO" branch of 1210), support prediction unit 218 may classify the current user for standard support (1214). For instance, if the current user is classified for standard support, support prediction unit 218 may take fewer proactive measures to help the current user adjust their hearing instruments. For example, support prediction unit 218 may not immediately refer the current user to a hearing professional. Thus, in this way, support prediction unit 218 may determine an anticipated user support level for the current user based on the profile of user 104.

Figure 13:
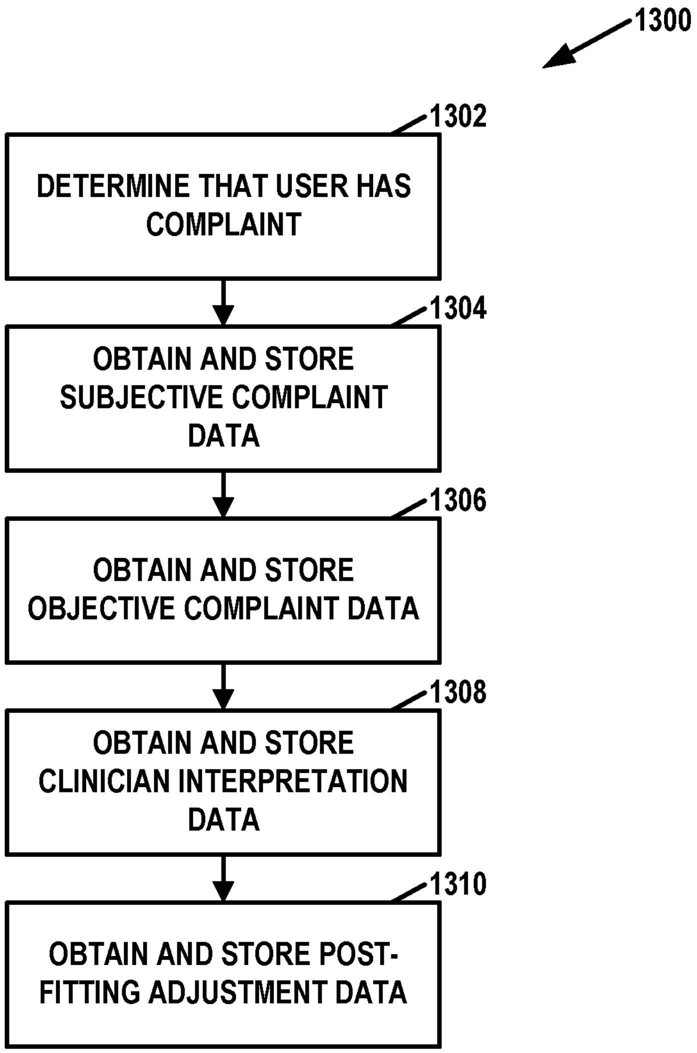
FIG. 13 is a flowchart illustrating an example operation for generating an adjustment record, in accordance with one or more aspects of this disclosure.

FIG. 13 is a flowchart illustrating an example operation for generating an adjustment record, in accordance with one or more aspects of this disclosure. In the example of FIG. 13, record generation unit 220 may determine that user 104 has a complaint regarding the setting of hearing instruments 102 (1302). For instance, record generation unit 220 may determine that user 104 has a complaint based on an explicit indication of user input indicating that user 104 has the complaint. In some examples, record generation unit 220 may determine that user 104 has the complaint without receiving an explicit indication of user input indicating that user 104 has the complaint. For instance, record generation unit 220 may determine that user 104 has a complaint based on user 104 interacting with hearing instruments 102 (e.g., adjusting volume levels, manually changing settings, etc.), based on abnormal movement of user 104, based on detected stress levels of user 104, and/or other factors.

Furthermore, record generation unit 220 may obtain and store subjective complaint data (1304). For example, record generation unit 220 may prompt user 104 to provide a description of their complaint via a user interface, such as a voice interface or graphical user interface. Record generation unit 220 may store the subjective complaint data in data storage system 224. Record generation unit 220 may also obtain and store objective complaint data (1306). For instance, record generation unit 220 may obtain acoustic environment data from hearing instruments 102 and other objective information associated with the complaint.

Record generation unit 220 may also obtain and store clinician interpretation data (1308). For example, record generation unit 220 may provide a user interface that enables record generation unit 220 to receive indications of user input from hearing professional 232 indicating their interpretation of the complaint of user 104. In examples where the interface includes a graphical user interface, the interface may include features, such as radio boxes, checkboxes, text entry boxes, to receive the user input. In some examples, the user interface may include a voice user interface.

Furthermore, record generation unit 220 may obtain and store post-fitting adjustment data (1310). For example, post-fitting adjustment unit 214 may use post-fitting adjustment model 204 to generate the post-fitting adjustment suggestions 230 (i.e., suggested post-fitting adjustment data) for user 104. If the post-fitting adjustment suggestions are accepted (e.g., by user 104 and/or hearing professional 232), record generation unit 220 may store the post-fitting adjustment data. In some examples, post-fitting adjustment unit 214 may receive indications of user input indicating the post-fitting adjustment data. Record generation unit 220 may store this post-fitting adjustment data in data storage system 224.

Thus, in the example of FIG. 13, record generation unit 220 may generate an adjustment record that includes data describing a post-fitting adjustment to settings of one or more hearing instruments of a specific user in the plurality of users. Record generation unit 220 may generate the adjustment record in response to determining that the specific user has a complaint (e.g., which the user may explicitly indicator or may be implicitly determined). The adjustment record may further include one or more of: data describing a subjective complaint of the user that led to the post-fitting adjustment, data indicative of the activities of user 104 and listening experiences of user 104, objective data associated with the subjective complaint, data describing a hearing professional's interpretation of the subjective complaint of the user, or data describing a plan and/or performed actions for addressing the subjective complaint of the user. Record generation unit 220 may store the subjective complaint data, objective complaint data, clinician interpretation data, and post-fitting adjustment data in one of a variety of ways. For example, record generation unit 220 may generate adjustment records to store such data. In some examples, an adjustment record may be a single data object. For instance, an adjustment record may correspond to a row of a database table. However, in other examples, other data structures may be used to store the information of an adjustment records. These other data structures do not necessarily correspond to a single database row or table, BLOB, or other type of data structure. Rather, in some examples, an adjustment record may be conceptual and not be reflected in any way in how the data within the adjustment record is actually stored. As discussed elsewhere in this disclosure, record generation unit 220 may, in some examples, cause the adjustment record to be stored in a non-volatile storage device of a hearing instrument of user 104. In some examples, record generation unit 220 may cause the adjustment record to be stored in a non-volatile storage system of a server system (e.g., computing system 106) remote from hearing instruments 102 of user 104. In some such examples, record generation unit 220 may cause a resource identifier of the adjustment record to be stored on a non-volatile storage device of one or more of hearing instruments 102 of user 104.

Similarly, user profile data 228 may be stored in one of a variety of ways. For instance, in some examples, user profile data 228 for a user may correspond to a row of a database table. However, in other examples, other data structures may be used to store user profile information. These other data structures do not necessarily correspond to a single database row or table, BLOB, or other type of data structure. Rather, in some examples, user profile data may be conceptual and not be reflected in any way in how the data within the user profile data is actually stored.

In some examples, record generation unit 220 may enable users, hearing professionals, and/or other people to edit adjustment records 238 and/or user profile data 228. Record generation unit 220 may enforce authentication and privacy requirements on people attempting to view and edit adjustment records 238 and/or user profile data 228.

The following is a non-limiting list of examples that are in accordance with one or more techniques of this disclosure.

Example 1: A method for fitting a hearing instrument includes generating, by a processing system, training data based on post-fitting adjustments made to settings of a plurality of hearing instruments and based on profiles of users of the plurality of hearing instruments, wherein the post-fitting adjustments are made to the settings of the plurality of hearing instruments after initial uses of the plurality of hearing instruments; training, by the processing system, a machine learning (ML) model based on the training data to generate initial fitting suggestions; and prior to an initial use of a current hearing instrument by a current user, generating, by the processing system, an initial fitting suggestion for the hearing instrument of the current user by applying the ML model to input that includes a profile of the current user.

Example 2: The method of example 1, further comprising configuring the current hearing instrument based on the initial fitting suggestion.

Example 3: The method of any of examples 1 and 2, wherein the method further comprises generating an adjustment record that includes data describing a post-fitting adjustment to settings of one or more hearing instruments of a specific user in the plurality of users, the adjustment record further including one or more of: data describing a complaint as subjectively perceived by the specific user that led to the post-fitting adjustment, objective data associated with the complaint, data describing a hearing professional's interpretation of the complaint, or data describing a plan or performed actions for addressing the complaint, and wherein generating the training data comprises generating the training data based in part on the adjustment record.

Example 4: The method of example 3, further includes causing, by the processing system, the adjustment record to be stored in a non-volatile storage device of the current hearing instrument of the current user.

Example 5: The method of any of examples 3 and 4, further includes causing, by the processing system, the adjustment record to be stored in a non-volatile storage system of a server system remote from the current hearing instrument of the current user; and causing, by the processing system, a resource identifier of the adjustment record to be stored on a non-volatile storage device of the current hearing instrument of the current user.

Example 6: The method of any of examples 1 through 5, wherein the ML model is a first ML model, the method further includes training, by the processing system, a second ML model based on the post-fitting adjustments and the profiles of the users to determine user support levels that indicate levels of user support associated with the users of the plurality of hearing instruments; and determining, by the processing system, an anticipated user support level for the current user based on the profile of the current user.

Example 7: The method of any of examples 1 through 6, wherein the ML model is a first ML model, and the training data is first training data, the method further includes generating second training data based on the post-fitting adjustments made to the settings of the plurality of hearing instruments and based on the profiles of the users of the plurality of hearing instruments; training a second ML model based on the second training data to determine post-fitting adjustment suggestions; and after the initial use of the current hearing instrument by the current user, generating a post-fitting adjustment suggestion for the current hearing instrument by applying the second ML model to input that includes the profile of the current user.

Example 8: A computing system includes a data storage system configured to store data indicating post-fitting adjustments made to settings of a plurality of hearing instruments and profiles of users of the plurality of hearing instruments; and a processing system configured to: generate training data based on the post-fitting adjustments made to the settings of the plurality of hearing instruments and based on the profiles of the users of the plurality of hearing instruments, wherein the post-fitting adjustments are made to the settings of the plurality of hearing instruments after initial uses of the plurality of hearing instruments; train a machine learning (ML) model based on the training data to generate initial fitting suggestions; and prior to an initial use of a current hearing instrument by a current user, generate an initial fitting suggestion for the hearing instrument of the current user by applying the ML model to input that includes a profile of the current user.

Example 9: The computing system of example 8, wherein the processing system is further configured to configure the current hearing instrument based on the initial fitting suggestion.

Example 10: The computing system of any of examples 8 and 9, wherein the processing system is further configured to generate an adjustment record that includes data describing a post-fitting adjustment to settings of one or more hearing instruments of a specific user in the plurality of users, the adjustment record further including one or more of: data describing a complaint as subjectively perceived by the specific user that led to the post-fitting adjustment, objective data associated with the complaint, data describing a hearing professional's interpretation of the complaint, or data describing a plan or performed actions for addressing the complaint, and wherein the processing system is configured to generate the training data based in part on the adjustment record.

Example 11: The computing system of example 10, wherein the processing system is further configured to cause the adjustment record to be stored in a non-volatile storage device of the current hearing instrument of the current user.

Example 12: The computing system of any of examples 10 and 11, wherein the processing system is further configured to: cause the adjustment record to be stored in a non-volatile storage system of a server system remote from the current hearing instrument of the current user; and cause a resource identifier of the adjustment record to be stored on a non-volatile storage device of the current hearing instrument of the current user.

Example 13: The computing system of any of examples 8 through 12, wherein the ML model is a first ML model, the processing system is further configured to: train a second ML model based on the post-fitting adjustments and the profiles of the users to determine user support levels that indicate levels of user support associated with the users of the plurality of hearing instruments; and determine an anticipated user support level for the current user based on the profile of the current user.

Example 14: The computing system of any of examples 8 through 13, wherein the ML model is a first ML model, and the training data is first training data, the processing system is further configured to: generate second training data based on the post-fitting adjustments made to the settings of the plurality of hearing instruments and based on the profiles of the users of the plurality of hearing instruments; train a second ML model based on the second training data to determine post-fitting adjustment suggestions; and after the initial use of the current hearing instrument by the current user, generating a post-fitting adjustment suggestion for the current hearing instrument by applying the second ML model to input that includes the profile of the current user.

Example 15: A computing system comprising means for performing the methods of any of examples 1-7.

Example 16: A computer-readable storage medium having instructions stored thereon that, when executed, cause a computing system to perform the methods of any of examples 1-7.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user. Furthermore, it is to be understood that discussion in this disclosure of hearing instrument 102A (including components thereof, such as an in-ear assembly, speaker 108A, microphone 110A, processors 112A, etc.) may apply with respect to hearing instrument 102B.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair cable, digital subscriber line (DSL), or wireless technologies such as infrared, radio, and microwave, then the coaxial cable, fiber optic cable, twisted pair cable, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. The terms disk and disc, as used herein, may include compact discs (CDs), optical discs, digital versatile discs (DVDs), floppy disks, Blu-ray discs, hard disks, and other types of spinning data storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method for fitting a hearing instrument, the method comprising:

generating, by a processing system, training data based on post-fitting adjustments made to settings of a plurality of hearing instruments and based on profiles of a plurality of users of the plurality of hearing instruments, wherein the post-fitting adjustments are made to the settings of the plurality of hearing instruments after initial uses of the plurality of hearing instruments;

training, by the processing system, a machine learning (ML) model based on the training data to generate initial fitting suggestions; and prior to an initial use of a current hearing instrument by a current user who is not among the plurality of users, generating, by the processing system, an initial fitting suggestion for the current hearing instrument by applying the ML model to input that includes a profile of the current user.

2. The method of claim 1, further comprising configuring the current hearing instrument based on the initial fitting suggestion for the current hearing instrument.

3. The method of claim 1, wherein the method further comprises generating an adjustment record that includes data describing a post-fitting adjustment to settings of one or more hearing instruments of a specific user in the plurality of users, the adjustment record further including one or more of: data describing a complaint as subjectively perceived by the specific user that led to the post-fitting adjustment, objective data associated with the complaint, data describing a hearing professional's interpretation of the complaint, or data describing a plan or performed actions for addressing the complaint, and wherein generating the training data comprises generating the training data based in part on the adjustment record.

4. The method of claim 3, further comprising: causing, by the processing system, the adjustment record to be stored in a non-volatile storage device of one or more hearing instruments of the specific user.

5. The method of claim 3, further comprising:

causing, by the processing system, the adjustment record to be stored in a non-volatile storage system of a server system remote from the one or more hearing instruments of the specific user; and causing, by the processing system, a resource identifier of the adjustment record to be stored on a non-volatile storage device of the one or more hearing instruments of the specific user.

6. The method of claim 3, wherein:

the method further comprises determining, by the processing system, that the specific user has the complaint without receiving an explicit indication of user input indicating the specific user has the complaint, and generating the adjustment record comprises generating the adjustment record in response to determining that the specific user has the complaint.

7. The method of claim 1, wherein the ML model is a first ML model, the method further comprising:

training, by the processing system, a second ML model based on the post-fitting adjustments and the profiles of the plurality of users to determine user support levels that indicate levels of user support associated with the plurality; and applying, by the processing system, the second ML model to determine an anticipated user support level for the current user based on the profile of the current user.

8. The method of claim 1, wherein the ML model is a first ML model, and the training data is first training data, the method further comprising:

generating second training data based on the post-fitting adjustments made to the settings of the plurality of hearing instruments and based on the profiles of the plurality of users;

training a second ML model based on the second training data to determine post-fitting adjustment suggestions; and after the initial use of the current hearing instrument by the current user, generating, by the processing system, a post-fitting adjustment suggestion for the current hearing instrument by applying the second ML model to input that includes the profile of the current user.

9. A computing system comprising:

a data storage system configured to store data indicating post-fitting adjustments made to settings of a plurality of hearing instruments and profiles of a plurality of users of the plurality of hearing instruments; and a processing system configured to:

generate training data based on the post-fitting adjustments made to the settings of the plurality of hearing instruments and based on the profiles of the plurality of users of the plurality of hearing instruments, wherein the post-fitting adjustments are made to the settings of the plurality of hearing instruments after initial uses of the plurality of hearing instruments;

train a machine learning (ML) model based on the training data to generate initial fitting suggestions; and prior to an initial use of a current hearing instrument by a current user who is not among the plurality of users, generate an initial fitting suggestion for the current hearing instrument by applying the ML model to input that includes a profile of the current user.

10. The computing system of claim 9, wherein the processing system is further configured to configure the current hearing instrument based on the initial fitting suggestion for the current hearing instrument.

11. The computing system of claim 9, wherein the processing system is further configured to generate an adjustment record that includes data describing a post-fitting adjustment to settings of one or more hearing instruments of a specific user in the plurality of users, the adjustment record further including one or more of: data describing a complaint as subjectively perceived by the specific user that led to the post-fitting adjustment, objective data associated with the complaint, data describing a hearing professional's interpretation of the complaint, or data describing a plan or performed actions for addressing the complaint, and wherein the processing system is configured to generate the training data based in part on the adjustment record.

12. The computing system of claim 11, wherein the processing system is further configured to cause the adjustment record to be stored in a non-volatile storage device of the one or more hearing instruments of the specific user.

13. The computing system of claim 11, wherein the processing system is further configured to:

cause the adjustment record to be stored in a non-volatile storage system of a server system remote from the one or more hearing instruments of the specific user; and cause a resource identifier of the adjustment record to be stored on a non-volatile storage device of the one or more hearing instruments of the specific user.

14. The computing system of claim 11, wherein:

the processing system is further configured to determine that the specific user has the complaint without receiving an explicit indication of user input indicating the specific user has the complaint, and the processing system is configured to generate the adjustment record in response to determining that the specific user has the complaint.

15. The computing system of claim 9, wherein the ML model is a first ML model and the processing system is further configured to:

apply a second ML model to determine an anticipated user support level for the current user based on the profile of the current user, wherein the second ML model has been trained based on the post-fitting adjustments and the profiles of the plurality of users to determine user support levels that indicate levels of user support associated with the plurality of users.

16. The computing system of claim 9, wherein the ML model is a first ML model, and the training data is first training data, the processing system is further configured to:

after the initial use of the hearing instrument by the current user, generating a post-fitting adjustment suggestion for the hearing instrument by applying a second ML model to input that includes the profile of the current user, wherein the second ML model has been trained based on second training data to determine post-fitting adjustment suggestions, and the second training data is generated based on the post-fitting adjustments made to the settings of the plurality of hearing instruments and based on the profiles of the plurality of users.

17. A method for fitting a hearing instrument, the method comprising:

prior to an initial use of a hearing instrument by a current user, generating, by a processing system, an initial fitting suggestion for the hearing instrument by applying a machine learning (ML) model to input that includes a profile of the current user, wherein:

the ML model has been trained based on training data to generate initial fitting suggestions, the training data is generated based on post-fitting adjustments made to settings of a plurality of hearing instruments and based on profiles of a plurality of users of the plurality of hearing instruments, the plurality of users not including the current user, and the post-fitting adjustments are made to the settings of the plurality of hearing instruments after initial uses of the plurality of hearing instruments; and configuring, by the processing system, the hearing instrument based on the initial fitting suggestion for the hearing instrument.

18. The method of claim 17, wherein the training data is generated based on part on an adjustment record that includes data describing a post-fitting adjustment to settings of one or more hearing instruments of a specific user in the plurality of users, the adjustment record further including one or more of: data describing a complaint as subjectively perceived by the specific user that led to the post-fitting adjustment, objective data associated with the complaint, data describing a hearing professional's interpretation of the complaint, or data describing a plan or performed actions for addressing the complaint.

19. The method of claim 17, wherein the ML model is a first ML model and the method further comprises:

applying, by the processing system, a second ML model to determine an anticipated user support level for the current user based on the profile of the current user, wherein the second ML model has been trained based on the post-fitting adjustments and the profiles of the plurality of users to determine user support levels that indicate levels of user support associated with the plurality of users.

20. The method of claim 17, wherein the ML model is a first ML model, and the training data is first training data, the method further comprising:

after the initial use of the hearing instrument by the current user, generating, by the processing system, a post-fitting adjustment suggestion for the hearing instrument by applying a second ML model to input that includes the profile of the current user, wherein the second ML model has been trained based on second training data to determine post-fitting adjustment suggestions, and the second training data is generated based on the post-fitting adjustments made to the settings of the plurality of hearing instruments and based on the profiles of the plurality of users.

* * * * *